(12) United States Patent
Takahara

(10) Patent No.: US 7,147,244 B2
(45) Date of Patent: Dec. 12, 2006

(54) AIR BAG APPARATUS

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 325 days.

(21) Appl. No.: 10/450,739

(22) PCT Filed: Dec. 27, 2001

(86) PCT No.: PCT/IB01/02692

§ 371 (c)(1),
(2), (4) Date: Jun. 17, 2003

(87) PCT Pub. No.: WO02/051671

PCT Pub. Date: Jul. 4, 2002

(65) Prior Publication Data

US 2004/0070184 A1 Apr. 15, 2004

(30) Foreign Application Priority Data

Dec. 27, 2000 (JP) ............................ 2000-398692
Jun. 7, 2001 (JP) ............................ 2001-172112

(51) Int. Cl.
*B60R 21/26* (2006.01)
(52) U.S. Cl. .................... 280/730.2; 280/742
(58) Field of Classification Search ............ 280/730.2, 280/740, 742, 736
See application file for complete search history.

(56) References Cited

U.S. PATENT DOCUMENTS

| | | | |
|---|---|---|---|
| 3,868,125 A * | 2/1975 | Fisher et al. ................. | 280/740 |
| 5,788,270 A | 8/1998 | Haland et al. | |
| 5,941,563 A * | 8/1999 | Schoenborn ................. | 280/740 |
| 5,988,677 A * | 11/1999 | Adomeit et al. ............. | 280/740 |
| 6,073,961 A | 6/2000 | Bailey et al. | |
| 6,103,984 A * | 8/2000 | Bowers et al. ............ | 280/730.2 |
| 6,155,596 A * | 12/2000 | Nakajima et al. ......... | 280/730.2 |
| 6,224,089 B1 * | 5/2001 | Uchiyama et al. ........ | 280/728.2 |
| 6,457,740 B1 * | 10/2002 | Vaidyaraman et al. ... | 280/730.2 |
| 6,554,314 B1 * | 4/2003 | Uchiyama et al. ....... | 280/730.2 |

FOREIGN PATENT DOCUMENTS

| | | |
|---|---|---|
| CN | 1181040 A | 5/1998 |
| DE | 197 27 832 A 1 | 12/1998 |
| EP | 0 773 142 A1 | 5/1997 |
| EP | 0 861 762 A1 | 9/1998 |
| GB | 1 203 490 | 8/1970 |
| JP | A-50-019123 | 2/1975 |
| JP | Y-6-4907 | 2/1994 |
| JP | A-8-48205 | 2/1996 |
| JP | U-3039217 | 4/1997 |
| JP | A-9-272396 | 10/1997 |
| JP | A-9-277899 | 10/1997 |
| JP | U-3044475 | 10/1997 |
| JP | A 11-301394 | 11/1999 |
| JP | A-11-301401 | 11/1999 |
| JP | A 11-321536 | 11/1999 |

(Continued)

*Primary Examiner*—David R. Dunn
(74) *Attorney, Agent, or Firm*—Oliff & Berridge, PLC

(57) ABSTRACT

In an air bag apparatus structured such that an air bag (11) housed in a part of a vehicle in a folded manner is inflated and deployed by a gas supplied from an inflator (14) so as to protect an occupant, the gas supplied from the inflator (14) is dispersed in a three-dimensional direction by a shower head (13a) so as to be supplied to a gas passage (11b) of the air bag (11).

42 Claims, 29 Drawing Sheets

FOREIGN PATENT DOCUMENTS

| | | |
|---|---|---|
| JP | A-2000-62564 | 2/2000 |
| JP | A 2000-127886 | 5/2000 |
| JP | A-2000-225913 | 8/2000 |
| JP | A-2000-296749 | 10/2000 |
| JP | A-2000-296752 | 10/2000 |
| JP | A-2000-335356 | 12/2000 |
| JP | A-2002-67868 | 3/2002 |

* cited by examiner

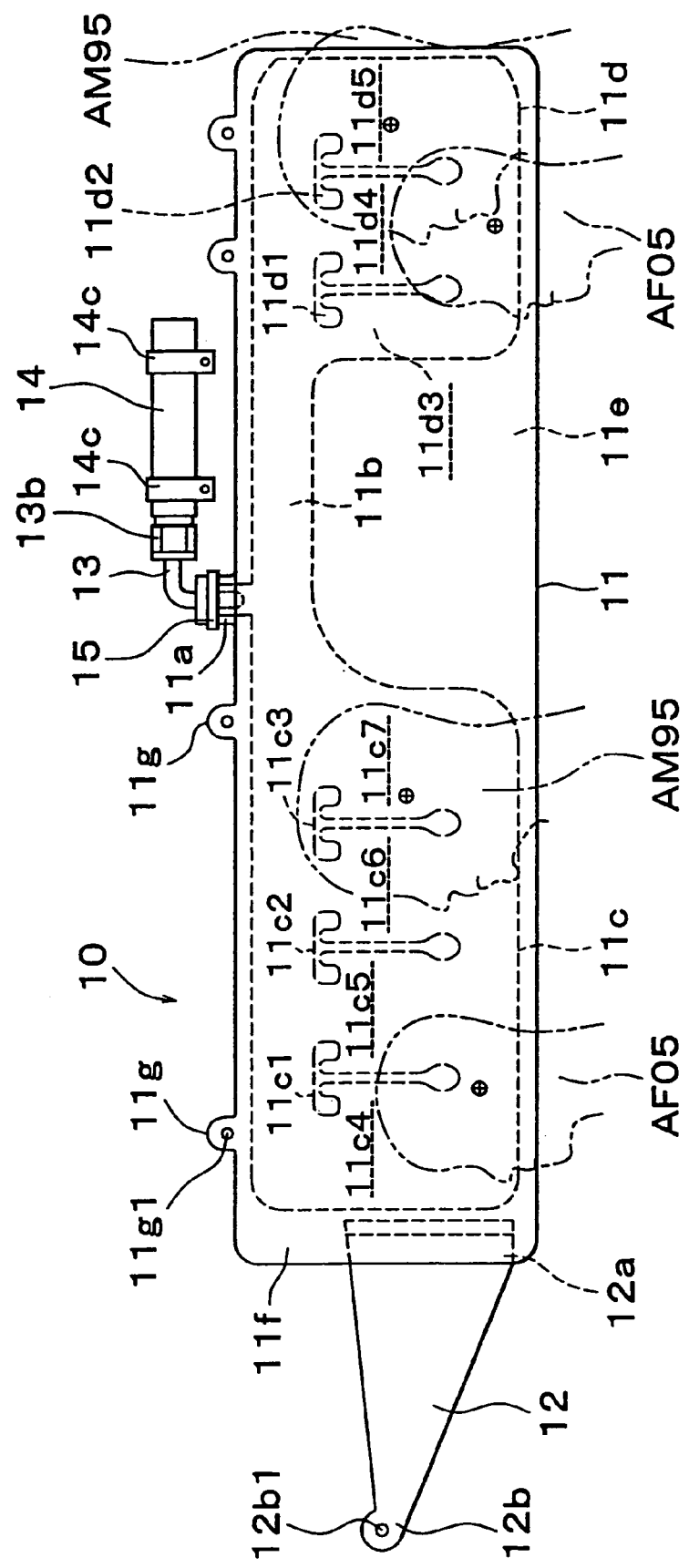

ant flat of the air bag so as to restrict bag damage and increase
airtight performance, or it is necessary to increase a gas
supply capacity of the inflator in addition to increasing
airtight performance of the air bag. In view of this, improv-
ing the inflating and deploying performance of the air bag

AIR BAG APPARATUS

FIELD OF THE INVENTION

The present invention relates to an air bag apparatus equipped in a vehicle, that is, an air bag apparatus structured such that an air bag housed in a part of the vehicle in a folded manner inflates and deploys by a gas supplied from an inflator so as to protect an occupant.

BACKGROUND OF THE INVENTION

This kind of air bag apparatus includes, for example, a structure in which an air bag housed along a roof side rail is inflated and deployed in a curtain-like shape along a side wall of a vehicle compartment by a gas supplied from an inflator so as to protect a head portion of an occupant, and a structure in which an air bag housed in an instrument panel is inflated and deployed toward an inner portion of the vehicle compartment due to the gas supplied from the inflator so as to protect a head portion and a chest portion of the occupant.

The conventional air bag apparatus mentioned above includes a structure in which an inner tube is internally provided along a gas passage (an inflow portion) of an air bag so as to restrict bag damage by the gas supplied to the air bag from the inflator, for example, as disclosed in Japanese Patent Application Laid-Open No. 11-321536, and a structure in which a cylindrical body is provided along a gas passage of an air bag so as to restrict bag damage by a gas supplied to the air bag from an inflator, for example, as disclosed in Japanese Patent Application Laid-Open No. 11-301394 and 2000-127886.

In these air bag apparatus, since the inner tube or the cylindrical body (a protecting member) mentioned above is provided in the gas passage of the air bag so as to restrict bag damage by the gas supplied to the air bag from the inflator, there is a risk that the inner tube or the cylindrical body mentioned above inhibits folding of the air bag, making it more difficult to house the air bag in the vehicle and cause a cost increase of the air bag apparatus.

On the contrary, in the air bag apparatus, it is necessary to satisfy various requirements in view of inflating and deploying performance of the air bag (a requirement of making a period of time after starting inflation and deployment until completion equal to or shorter than a set time, a requirement of maintaining an initial internal pressure after starting inflation and deployment until completion equal to or greater than a high set pressure, a requirement of maintaining an internal pressure equal to or greater than a low set pressure for a predetermined time after an initial predetermined time has elapsed after completing inflation and deployment, and the like).

In order to reduce the period of time for completing inflation and deployment of the air bag and increase the initial internal pressure, there is generally employed a countermeasure of increasing a gas supplying capacity of the inflator. However, when increasing the gas supplying capacity of the inflator, the bag damage is increased and it is impossible to increase a time of maintaining the internal pressure. Accordingly, it is necessary to sufficiently apply a coating for keeping airtightness, for example, onto a surface of the air bag so as to restrict bag damage and increase airtight performance, or it is necessary to increase a gas supply capacity of the inflator in addition to increasing airtight performance of the air bag. In view of this, improving the inflating and deploying performance of the air bag and reducing a cost is contradictive. Such a problem can be resolved by restricting the bag damage of the air bag by means capable of being realized at a low cost.

DISCLOSURE OF THE INVENTION

In accordance with a first aspect of the present invention, there is provided an air bag apparatus structured such that an air bag housed in a part of a vehicle in a folded manner is inflated and deployed by a gas supplied from an inflator so as to protect an occupant, wherein the gas supplied from the inflator is dispersed in a three-dimensional direction so as to be supplied to a gas passage of the air bag.

In accordance with the first aspect mentioned above, the gas supplied from the inflator is dispersed into the gas passage of the air bag in the three-dimensional direction. Accordingly, at an early stage of inflation and deployment of the air bag, the gas passage of the air bag housed in the folded manner is quickly expanded, whereby an area of the air bag under the gas pressure is increased and an effective passage area in the gas passage can be sufficiently secured.

Accordingly, a part of the gas passage in the air bag is not put under a large load due to the supplied gas, and it is possible to restrict bag damage in the portion mentioned above. Therefore, it is possible to simplify a countermeasure applied to the gas passage, that is a countermeasure against the gas pressure in the air bag, it is possible to easily fold the air bag compact, it is possible to make it easier to house the air bag in the vehicle, and it is possible to reduce a cost of the air bag. Further, it is possible to improve a gas supplying performance in the gas passage by securing an effective passage area in the gas passage, and it is possible to improve inflating and deploying performance of the air bag.

In accordance with the first aspect, in the gas injection port exposed to the gas passage of the air bag, it is possible to disperse the gas supplied from the inflator in the three-dimensional direction. In this case, it is also possible to employ flow changing means for changing a flow of the gas supplied from the inflator or it is also possible to employ flow dividing means for dividing the flow of the gas supplied from the inflator into a plurality of sections. In accordance with the structures mentioned above, it is possible to efficiently obtain an operating effect due to the dispersion of the gas mentioned above in the three-dimensional direction.

In accordance with a second aspect of the present invention, there is provided an air bag apparatus structured such that an air bag housed in a part of a vehicle in a folded manner is inflated and deployed by a gas supplied from an inflator so as to protect an occupant, wherein a shower head for dispersing the gas supplied from the inflator in a three-dimensional direction is disposed so as to face a gas passage of the air bag. In accordance with the aspect, it is also possible to achieve an operating effect by the dispersion in the three-dimensional direction of the gas mentioned above.

In the second aspect mentioned above, the structure can be made such that the shower head has a plurality of injection holes.

Further, in the second aspect mentioned above, the structure can be made such that the shower head is formed in a semispherical shape and has a plurality of injection holes on a spherical surface thereof. In accordance with this structure, it is possible to radially inject and supply the gas so as to improve an efficiency of supplying the gas. In accordance with this structure, it is also possible to improve inflating and deploying performance of the air bag.

In these cases, the structure can be made such that the injection holes of the shower head are provided in symmetric with respect to a point of a center of the shower head. In accordance with this structure, even when the shower head is assembled in a state of rotating around the center thereof, it is possible to obtain the gas injecting performance with no change. Accordingly, in the case that the shower head is integrally assembled in the inflator, a flexibility in mounting the inflator to the vehicle is increased.

Further, in these cases, the structure can be made such that the air bag is housed along a roof side rail and is inflated and deployed in a curtain-like shape along a vehicle compartment side wall due to the gas supplied from the inflator so as to protect a head portion of the occupant, the air bag is provided with a front seat inflating portion, a rear seat inflating portion and a gas passage for communicating upper portions of both of these inflating portions, and the shower head is disposed so as to face the gas passage. In accordance with this structure, the gas supplied from the inflator is dispersed in the three-dimensional direction by the shower head in the gas passage of the air bag provided with the front seat inflating portion and the rear seat inflating portion. Accordingly, in addition that it is possible to obtain the operating effect given by the dispersion of the gas in the three-dimensional direction mentioned above, it is possible to properly distribute and supply the gas toward the front seat inflating portion and the rear seat inflating portion, and it is possible to properly inflate and deploy the front seat inflating portion and the rear seat inflating portion.

Further, in this case, it is possible to set opening areas of an injection hole for the front seat and an injection hole for the rear seat provided in the shower head corresponding to capacities of expansion chambers in the front seat inflating portion and the rear seat inflating portion. In accordance with this structure, it is possible to substantially coincide an inflating and deploying timing of the front seat inflating portion with that of the rear seat inflating portion in the air bag, whereby it is possible to reduce a period of time after starting inflation and deployment of the air bag until completion, and it is possible to improve a motion during inflating and deploying the air bag.

Further, the shower head may be formed by a mesh. Further, the shower head may be formed by a porous body. In accordance with these structures, it is also possible to achieve the operating effect given by the dispersion in the three-dimensional direction of the gas. In these cases, it is possible to easily change and set a dispersion performance by changing an aspect or a material of the shower head.

In these cases, the shower head may be formed in a semispherical shape. In accordance with this structure, it is possible to inject and supply the gas to a whole in the three-dimensional direction with a good balance.

Further, the shower head may be provided in a front end of a diffuser pipe assembled in the inflator. In accordance with this structure, the gas can be supplied to an optimum position of the gas passage in the air bag, by a shape of the diffuser pipe, whereby it is possible to commonly use the inflator.

In this case, the shower head may be integrally provided in the inflator. In accordance with this structure, it is possible to reduce a length of a gas flow passage from the inflator to the gas passage of the air bag, whereby it is possible to reduce an inflating and deploying period of the air bag.

In these cases, the structure can be made such that the air bag is housed along a roof side rail and is inflated and deployed in a curtain-like shape along a vehicle compartment side wall due to the gas supplied from the inflator so as to protect a head portion of the occupant, the air bag is provided with an inflating portion for a front seat and an inflating portion for a rear seat and a gas passage for communicating upper portions of both of these inflating portions, and the shower head is disposed so that the gas can flow into the gas passage in a crossing manner. In accordance with this structure, the gas supplied from the inflator is dispersed in the three-dimensional direction by the shower head in the gas passage of the air bag provided with the front seat inflating portion and the rear seat inflating portion. Accordingly, in addition that it is possible to obtain the operating effect given by the dispersion of the gas in the three-dimensional direction mentioned above, it is possible to properly distribute and supply the gas toward the front seat inflating portion and the rear seat inflating portion, and it is possible to properly inflate and deploy the front seat inflating portion and the rear seat inflating portion.

Further, in the case mentioned above, the structure can be made such that the shower head does not protrude within the gas passage of the air bag. In accordance with this structure, it is possible to prevent a fold of the air bag from being blocked out by the shower head, and it is possible to fold the air bag in a compact manner, thereby it is not made more difficult to house the air bag to the vehicle.

Further, in the case mentioned above, the structure can be made such that the inflator is arranged in a center portion in a longitudinal direction of a vehicle. In accordance with this structure, it is possible to reduce a length of each of the gas flow passages from the inflator to the front seat inflating portion and the rear seat inflating portion in the air bag, whereby it is possible to reduce the inflating and deploying period of the front seat inflating portion and the rear seat inflating portion in the air bag.

In the case mentioned above, the structure can be made such that the inflator is arranged in a longitudinal direction along a roof side rail above the air bag, or the inflator is arranged in a vehicle width direction along a roof panel above the air bag. In these cases, a flexibility in mounting the inflator is high.

In the case mentioned above, the diffuser pipe may be formed in a substantially J shape. In accordance with this structure, it is possible to arrange the inflator in the longitudinal direction along the roof side rail or arrange the inflator in the vehicle width direction along the roof panel, with keeping the same structures of the air bag, the inflator and the diffuser pipe, whereby it is possible to reduce a cost due to use the parts commonly.

Further, the shower head provided in the front end of the diffuser pipe assembled in the inflator, or the shower head integrally provided in the inflator may be coaxially arranged with respect to the longitudinal direction of the gas passage communicating with the inflating chamber of the air bag. In this case, it is also possible to obtain the operating effect given by the dispersion of the gas in the three-dimensional direction mentioned above.

In this case, the structure can be made such that the inflator is arranged in front of or at the rear of the vehicle of the air bag. Further, the shower head may be arranged in the gas passage at a portion of the air bag communicating with the inflating chamber. In accordance with the structures mentioned above, it is possible to directly supply a part of the gas dispersed in the three-dimensional direction by the shower head to the inflating chamber of the air bag.

Further, the structure can be made such that a plurality of injection holes provided in the shower head are concentrically arranged with a center of the front end of the shower head so as to form a plurality of lines. In accordance with this structure, it is possible to suitably set a dispersion effect of the gas on the basis of an arrangement of the injection holes, and it is possible to reduce bag damage and improve a gas supplying efficiency with a good balance.

In the case mentioned above, the structure can be made such that a plurality of inner and outer injection holes concentrically arranged and being adjacent to each other in a radial direction are arranged in a circumferential direction so as to form a zigzag form. In accordance with this structure, it is possible to prevent the gas injected from a plurality of inner and outer injection holes concentrically arranged and being adjacent in the radial direction from being interfered with each other, it is possible to disperse the gas to the gas passage of the air bag from the respective injection holes of the shower head with a good balance, and it is possible to further reduce the bag damage and further improve the gas supplying efficiency.

Further, the structure can be made such that the shower head is formed in a stepped shape having multiple steps which become smaller toward the front end, and a plurality of injection holes are formed in the respective step portions in an inclined manner. In accordance with this structure, since the shower head is formed in the stepped shape having multiple steps which become smaller toward the front end of the shower head, it is possible to secure a gas pressure within the front end of the shower head, it is possible to level the gas pressure at a time when the gas flows in the respective injection holes and it is possible to level the gas flow flowing through the respective injection holes. Further, since a plurality of injection holes are formed in the respective step portions in the inclined manner, it is possible to form the substantially conical gas flow expanding downward in a concentric and multiple shape, and it is possible to diffuse the gas flow with a good balance.

Further, the structure can be made such that the injection holes are formed in a fan shape expanding toward the front end. In accordance with this structure, a pressure loss due to a shearing resistance (a wall surface resistance) becomes greater in comparison with the structure of the injection holes having a complete round shape, and an angle of diffusion of the gas flow is increased. Accordingly, by properly setting an opening angle of the fan shape, it is possible to adjust the gas flow and adjust a deploying property and a directivity of the air bag.

Further, the structure can be made such that the front end of the shower head is formed in an asymmetrical shape with respect to a center axis thereof and the injection holes are formed in the asymmetrical surface. In accordance with this structure, by properly setting the front end shape of the shower head, it is possible to adjust the gas flow and adjust the deploying property and the directivity of the air bag.

Further, the structure can be made such that the injection hole is formed in a stepped shape and a thickness of a minimum hole portion is made small. In accordance with this structure, it is possible to reduce the pressure loss in the injection hole while securing a strength, required for the shower head.

Further, the structure can be made such that the injection holes formed in the front end wall of the shower head are inclined with respect to the wall surface of the front end wall. In accordance with this structure, an apparent opening area of the inclined injection holes is reduced and an amount of the pressure loss is increased. Further, it is possible to adjust the gas flow by changing the distribution or the angle of inclination of the inclined injection holes, and it is possible to adjust the deploying property and the directivity of the air bag.

Further, the structure can be made such that the shower head is formed in a closed-end cylindrical shape or a close-end polygonal tubular shape, the injection holes are formed in the front end wall of the shower head, and the injection holes are formed so as to ride over the front wall of the shower head and a peripheral wall. In accordance with this structure, it is possible to disperse (diffuse) the gas in multiple directions on the basis of a simple shape (structure). Further, the injection holes riding over the front end wall of the shower head and the peripheral wall can be easily formed by cutting the front end of the shower head obliquely, whereby it is easy to manufacture the shower head and it is possible to reduce a cost of the shower head.

Further, the structure can be made such that the front end portion of the diffuser pipe is formed so as to have a small diameter and the shower head is fitted and fixed to an outer periphery of the front end portion of the diffuser pipe. In accordance with this structure, it is possible to easily change the dispersion property of the gas, for example, corresponding to a shape, a magnitude or the like of the air bag, by replacing the shower head. Further, since the shower head may be manufactured independently, it is easy to process the injection holes in the shower head, and it is possible to commonly use the diffuser pipe, and widely reduce a cost.

In the case mentioned above, the structure can be made such that a gas supply port forming portion of the air bag is fixed to the step portion formed by the front end portion of the diffuser pipe and the shower head. In accordance with this structure, since it is possible to effectively utilize the step portion formed by the diffuser pipe and the shower head so as to fix the diffuser pipe and the shower head to the air bag, it is possible to improve an assembling operability and improve a fixing strength.

Further, the structure can be made such that hole diameters are made different between the front seat injection hole and the rear seat injection hole which are provided in the shower head, whereby it is possible to set the opening areas of the front seat injection hole and the rear seat injection hole corresponding to the capacities of the inflating chambers in the front seat inflating portion and the rear seat inflating portion. In accordance with this structure, it is possible to substantially coincide an inflating and deploying timing of the front seat inflating portion with that of the rear seat inflating portion in the air bag, whereby it is possible to reduce a period of time after starting inflation and deployment of the air bag until completion at a low cost, and it is possible to improve a motion during inflating and deploying the air bag without increasing a working process applied to the injection holes of the shower head.

In the case mentioned above, the structure can be made such that the front seat injection holes and the rear seat injection holes are respectively constituted by a plurality of injection holes, and a hole diameter of any one thereof is gradually reduced toward the center of the front end in the shower head. In accordance with this structure, it is possible to gradually reduce the gas flow injected corresponding to the hole diameter of the injection holes, it is possible to permit the gas to have a directivity, and it is possible to adjust the motion during inflating and deploying the air bag.

Further, the structure can be made such that numbers of holes are made different between the front seat injection hole and the rear seat injection hole which are provided in the shower head, whereby it is possible to set the opening areas of the front seat injection hole and the rear seat injection hole corresponding to the capacities of the inflating chambers in the front seat inflating portion and the rear seat inflating portion. In accordance with this structure, it is possible to substantially coincide an inflating and deploying timing of the front seat inflating portion with that of the rear seat inflating portion in the air bag by a working process applied to the injection holes of the shower head by means of the same tool (a working process of increasing the number of the injection holes in a side where an opening area is increased), whereby it is possible to reduce a period of time after starting inflation and deployment of the air bag until completion while reducing the bag damage due to an increase of the number of the injection holes (a reduction of the gas flow speed), and it is possible to improve the motion during inflating and deploying the air bag.

Further, the structure can be made such that an auxiliary inflating chamber communicating with the gas passage at an upper end below the front end of the shower head so as to extend in a vertical direction is provided in the air bag. In accordance with this structure, the gas also flows to the auxiliary inflating chamber of the air bag during inflating and deploying the air bag, whereby the deployment downward of the air bag is promoted. Accordingly, it is possible to reduce the time until completing the deployment of the air bag.

In the case mentioned above, the structure can be made such that a lower end of the auxiliary inflating chamber is communicated with at least one of the front seat inflating portion and the rear seat inflating portion. In accordance with this structure, it is possible to supply the gas to at least one of the front seat inflating portion and the rear seat inflating portion through the auxiliary inflating chamber, and it is possible to further reduce the time until completing the deployment of the air bag.

Further, in the case mentioned above, the structure can be made such that an opening area of a passage for communicating the auxiliary inflating chamber with the front seat inflating portion and an opening area of a passage for communicating the auxiliary inflating chamber with the rear seat inflating portion are set corresponding to the capacities of the inflating chambers in the front seat inflating portion and the rear seat inflating portion. In accordance with this structure, it is possible to substantially coincide the inflating and deploying timing of the front seat inflating portion with that of the rear seat inflating portion in the air bag while reducing the period of time until completing the deployment of the air bag.

Further, the structure can be made such that distribution in a longitudinal direction with respect to the center of the front end in the shower head is made different between the front seat injection hole and the rear seat injection hole which are provided in the shower head. In accordance with this structure, it is possible to adjust an injection pressure of the gas passing through the front seat injection hole and the rear seat injection hole, and it is possible to adjust the inflating and deploying timing of the front seat inflating portion and the rear seat inflating portion in the air bag.

Further, the structure can be made such that the injection hole provided in the shower head is formed in a long hole longer in the longitudinal direction. Further, the structure can be made such that an opening area of the injection hole being most apart in the longitudinal direction from the center of the front end of the shower head among a plurality of injection holes provided in the shower head is made larger than an opening area of the other injection holes. In accordance with these structures, it is possible to increase the gas flow in the longitudinal direction, it is possible to positively inflate and deploy the air bag by a leveled gas flow, and it is possible to inflate and deploy the air bag with keeping the directivity in the longitudinal direction.

Further, the structure can be made such that opening areas of the injection holes provided in the shower head are made different between an inner portion and an outer portion in the vehicle width direction. Further, the structure can be made such that numbers of the injection holes provided in the shower head are made different between an inner portion and an outer portion in the vehicle width direction. In accordance with these structures, it is possible to inflate and deploy the air bag in the portion in which the shower head is arranged, toward the inner portion or the outer portion in the vehicle width direction. Accordingly, for example, in the case of setting so as to inflate and deploy the air bag toward the inner portion in the vehicle width direction, it is possible to prevent the air bag in the middle of inflating and deploying from being caught on by an upper end portion of a B pillar garnish or the like, or in the case of setting so as to inflate and deploy the air bag toward the outer portion in the vehicle width direction, it is possible to inflate and deploy the air bag along the side glass surface.

Further, the structure can be made such that the gas supply port of the air bag to which the shower head is inserted is formed in a shape expanding at a predetermined angle toward the gas passage, and an angle of diffusion of the gas supplied from the shower head is made equal to or less than the predetermined angle. In accordance with this structure, it is possible to achieve both of a damage reduction of the gas supply port in the air bag and an improvement of diffusing property of the gas.

Further, the structure can be made such that an auxiliary inflating chamber communicating with the gas passage at an upper end below the front end of the shower head and extending in a vertical direction is provided in the air bag, and an angle of diffusion in the longitudinal direction of the gas supplied from the shower head is set to be equal to or greater than a predetermined value so that the gas is injected farther forward than an R end point disposed in a forward portion of the upper end of the auxiliary inflating chamber and farther rearward than an R end point disposed in a rearward portion of the upper end. In accordance with this structure, it is possible to well distribute the gas to the forward portion and the rearward portion of the gas passage while securing the inflow of the gas to the auxiliary inflating chamber, and it is possible to improve the gas distributing property toward the forward portion, the rearward portion and the downward portion from the shower head.

In the case mentioned above, the structure can be made such that the angle of forward diffusion of the gas from the shower head is made different from the angle of rearward diffusion. In accordance with this structure, it is possible to change the gas distribution to the forward portion and the rearward portion in the gas passage corresponding to the shape of the air bag (for example, a ratio of capacity of the inflating chamber between the front seat inflating portion and the rear seat inflating portion, and a shape of the inflating chamber), and it is possible to inflate and deploy the air bag in an optimum state.

Further, the structure can be made such that diffusing means for diffusing the gas supplied from the inflator in the three-dimensional direction is provided in a side of the air bag. In this case, it is also possible to achieve the operating effect given by the dispersion of the gas in the three-dimensional direction.

BRIEF DESCRIPTION OF THE DRAWINGS

FIG. 2 is an enlarged side elevational view of an air bag module shown in FIG. 1;

DETAILED DESCRIPTION OF THE PREFERRED EMBODIMENTS

Figure 1:
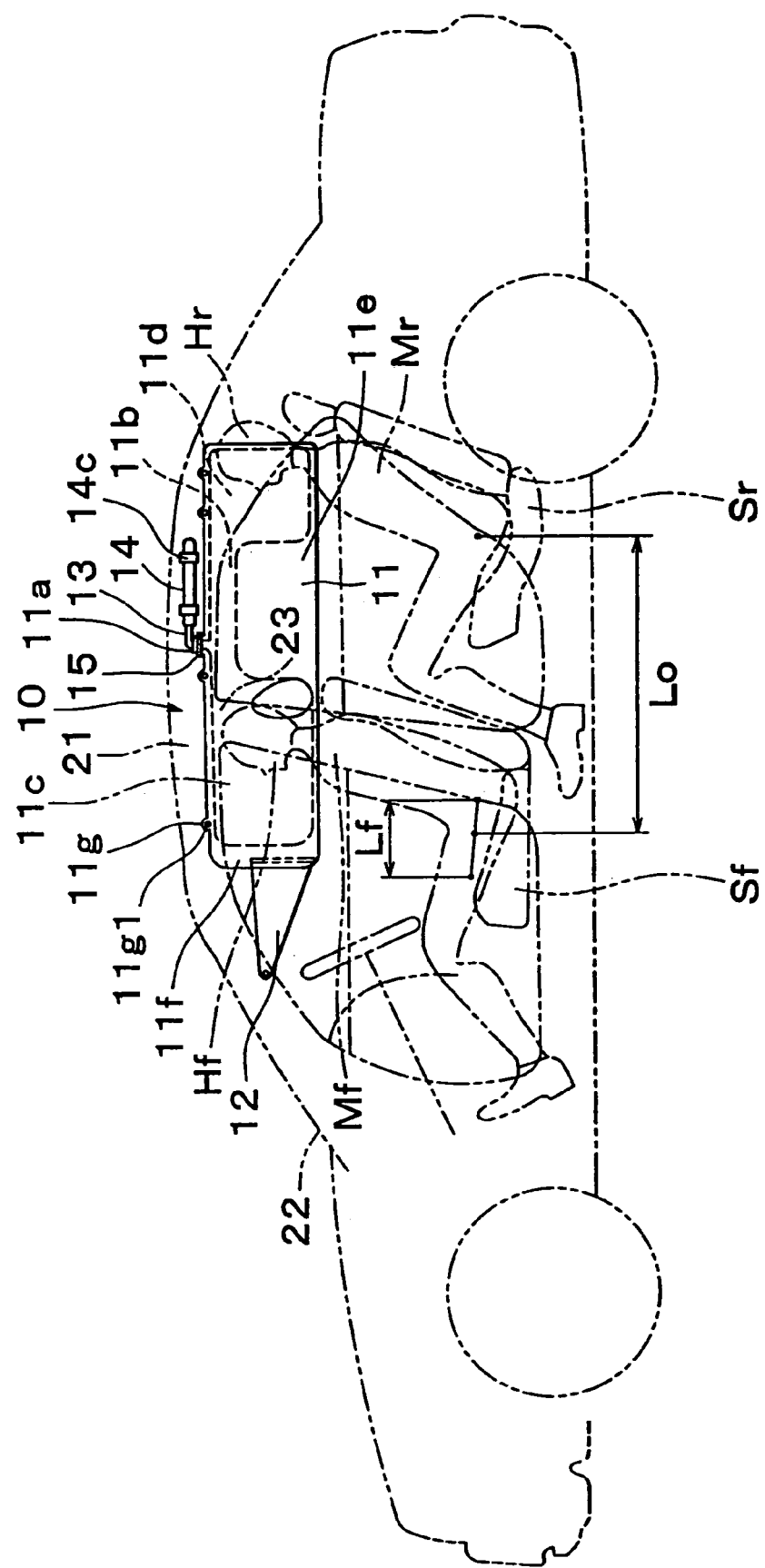
FIG. 1 is a side elevational view showing an embodiment obtained by applying the present invention to a head portion protecting air bag apparatus.

A description will be given below of an embodiment in accordance with the present invention with reference to the accompanying drawings. FIGS. 1 to 10 show an embodiment in which the present invention is applied to a head portion protecting air bag apparatus for a passenger car vehicle. The air bag apparatus in accordance with this embodiment is provided with an air bag module 10 constituted by an air bag 11 inflating and deploying in a curtain-like shape along a side wall of a vehicle compartment, a tension cloth 12 assembled in a front end portion of the air bag 11 and an inflator 14 assembled in an air tight manner in a gas supply port 11a of the air bag 11 together with a diffuser pipe 13.

The air bag 11 is formed in accordance with a double elastic webbing so that a direction of texture becomes longitudinally and vertically, has a coating for keeping airtightness applied to a surface thereof, has a gas supply port 11a, a gas passage 11b extending in a longitudinal direction so as to substantially cross to a lower end thereof vertically, an inflating portion for a front seat 11c and an inflating portion for a rear seat 11d communicating with each other through the gas passage 11b, and has an intermediate non-inflating portion 11e, a front end non-inflating portion 11f and four mounting piece portions 11g. In this case, a mounting hole 11g1 to a roof side rail 21 is provided in each of the mounting piece portions 11g.

The front seat inflating portion 11c is structured, as shown in FIGS. 1 and 2, such as to protect a head portion Hf of an occupant Mf sitting on a front seat Sf (a seat arranged corresponding to a B pillar 23), and is sectioned into four inflating chambers (cells) 11c4, 11c5, 11c6 and 11c7 in an inner portion of a center thereof by three T-shaped sectioning portions (non-inflating portions) 11c1, 11c2 and 11c3 provided in the center in a vertical direction, and the respective inflating chambers 11c4 to 11c7 are communicated with each other at both upper and lower ends.

The rear seat inflating portion 11d is structured, as shown in FIGS. 1 and 2, such as to protect a head portion Hr of an occupant Mr sitting on a rear seat Sr, and is sectioned into three inflating chambers (cells) 11d3, 11d4 and 11d5 in an inner portion of a center thereof by two T-shaped sectioning portions (non-inflating portions) 11d1 and 11d2 provided in the center in a vertical direction, and the respective inflating chambers 11d3 to 11d5 are communicated with each other at both upper and lower ends.

The tension cloth 12 is formed in a triangle shape (a shape can be suitably changed) by a non-coat woven fabric which is thinner and more inexpensive than the cloth constructing the air bag 11, is sewn up in a front end non-inflating portion 11f of the air bag 11 at a rear end portion 12a, and is structured such as to be assembled in an A pillar 22 by a mounting hole 12b1 provided in the front end portion 12b(refer to FIG. 1).

Figure 5:
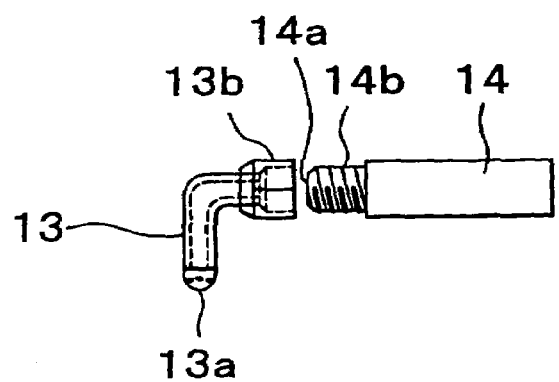
FIG. 5 is a side elevational view of a diffuser pipe and an inflator shown in FIG. 2.
Figure 9:
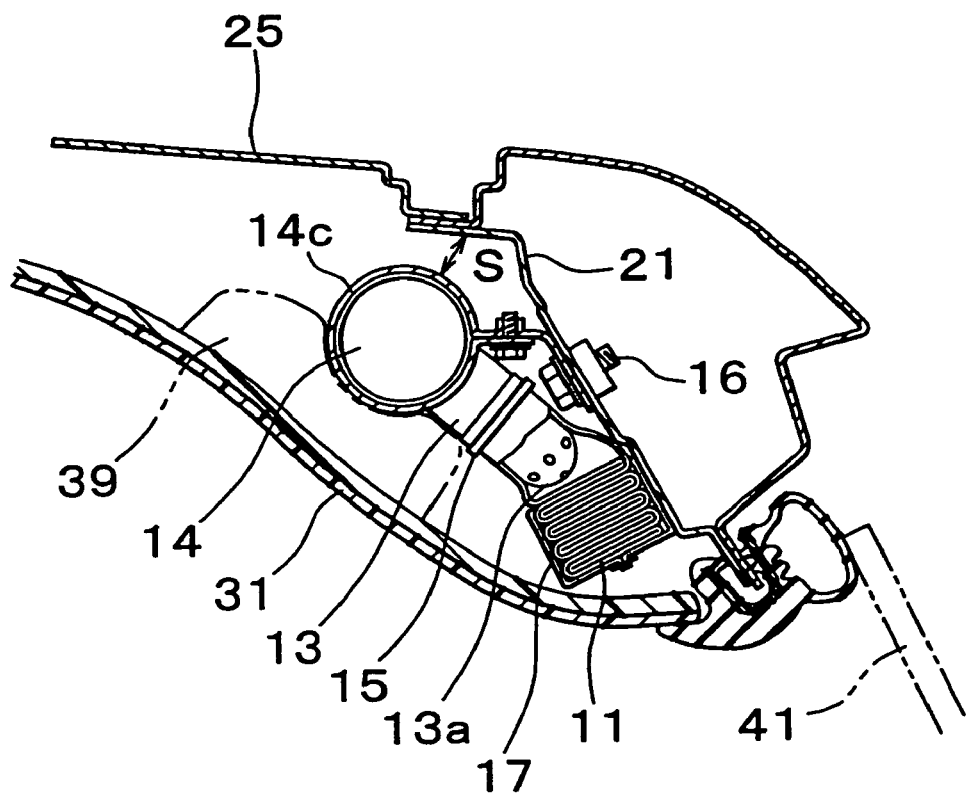
FIG. 9 is an enlarged vertical cross sectional back view obtained by vertically cross sectioning the air bag shown in FIGS. 1 and 2 at a rear portion rather than the inflator in a state of folding and accommodating state.

The diffuser pipe 13 is, as shown in FIGS. 2, 5 and 9, formed in a thin and substantially J shape, is assembled in an air tight manner in the gas supply port 11a of the air bag 11 by using a fastening band 15 in a state of being integrally connected and fixed in an air tight manner to a male screw portion 14b provided in a gas injection port 14a of the inflator 14 by using a flare nut 13b, has a diameter smaller than that of the gas supply port 11a and is set so that a desired gap is formed between the gas supply port 11a and the diffuser pipe 13. This gap corresponds to a gap allowing a gas radial injection at a front end of the diffuser pipe 13.

Further, the diffuser pipe 13 is arranged, as shown in FIG. 1, so that a front end thereof is directed obliquely downward along a door glass (a side glass) surface 41 (so as to be arranged to be substantially parallel to the door glass surface 41) as shown in FIG. 9, at a position a little to the rear of the B pillar 23, and is structured such as to supply the gas so as to cross to the gas passage 11b extending in a longitudinal direction of the air bag 11 from the above.

Further, a shower head 13a for dispersing (diffusing) the gas supplied from the inflator 14 in a three-dimensional direction (a radial direction) is integrally provided in a front end of the diffuser pipe 13 (a gas injection port of the diffuser pipe 13), that is, a portion facing to the gas passage 11b of the air bag 11, and a length of a front end portion in the diffuser pipe 13 is set so that the shower head 13a does not protrude out within the gas passage 11b of the air bag 11.

Figure 6:
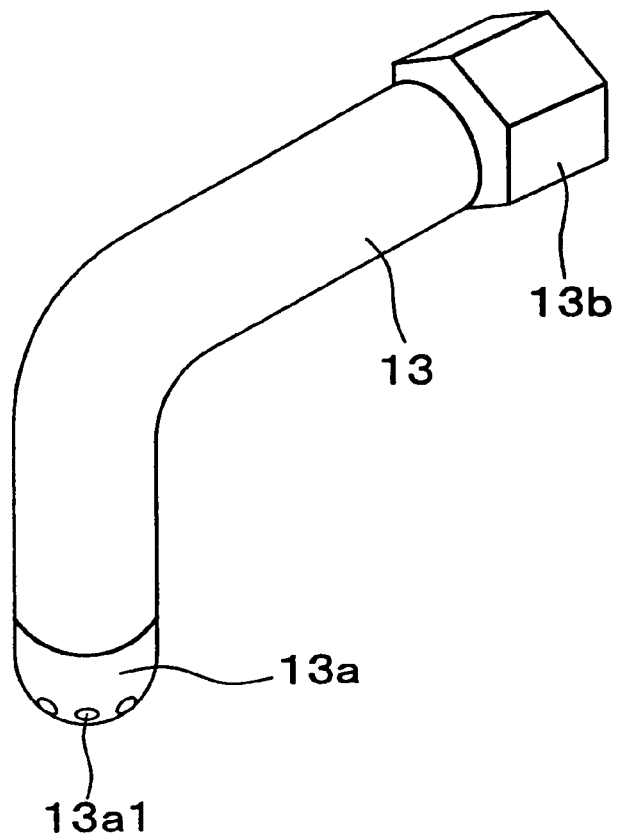
FIG. 6 is an enlarged perspective view of the diffuser pipe and a shower head shown in FIGS. 2 and 5.
Figure 7:
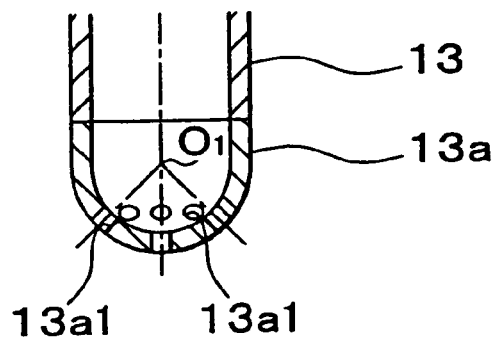
FIG. 7 is an enlarged vertical cross sectional view of the shower head shown in FIG. 6.
Figure 8:
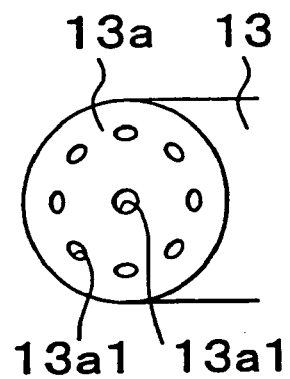
FIG. 8 is a bottom elevational view of the shower head shown in FIG. 7.

The shower head 13a has, as shown in FIGS. 6 to 8 in a detailed manner, a function of dispersing the gas supplied to the air bag 11 from the inflator 14 through the diffuser pipe 13 in a three-dimensional direction, and is formed in a substantially semispherical shape (refer to FIG. 7) by a metal raw material, and a plurality of injection holes 13a1 radially extending from a center O1 of a spherical surface thereof are provided on the spherical surface in symmetrical with respect to a point of a center (axis) of the shower head 13a.

A plurality of injection holes 13a1 are constituted by an injection hole provided in a center of the front end and eight injection holes provided at a uniform interval in a circumferential direction above the injection hole, and eight injection holes and the injection hole in the center of the front end have the same diameter. In this case, eight injection holes provided at the uniform interval in the circumferential direction may be achieved so as to have a diameter larger (or smaller) than the injection hole in the center of the front end (the center injection hole may be omitted). Further, the shower head 13a also serves as flow changing means for changing a flow of the gas supplied from the inflator 14, and further serves as flow dividing means for dividing the flow of the gas supplied from the inflator 14 into a plurality of sections.

The inflator 14 is structured such as to inject and supply the gas toward the air bag 11 at a time of a side collision of a vehicle or at a time of a roll over of the vehicle, and is assembled in a roof side rail 21 by a bracket 14c with using a bolt 16 or the like, as shown in FIG. 9. Further, the inflator 14 is arranged in a longitudinal direction along the roof side rail 21 above the air bag 11 in a center portion in the longitudinal direction of the vehicle, and is structured such as to be covered by a roof head lining 31. In this case, the bracket 14c shown in FIG. 9 corresponds to a bracket (an EA bracket) formed by a raw material (an energy absorbing raw material) which can be easily plastically deformed against an external force, and can absorb an energy at a stroke S until being brought into contact with the roof side rail 21. In the case that an amount of energy is a lot, it is possible to attach an energy absorbing pad 39 onto a back surface of the roof head lining 31, as shown by a virtual line.

In the air bag apparatus in accordance with the embodiment structured in the manner mentioned above, at a normal time, the air bag 11 and the tension cloth 12 are housed along the A pillar 22 and the roof side rail 21 in a state that they are fold up in multiple layers in the vertical direction and are housed in a breakable bag 17 (refer to FIGS. 9 and 10) in a compact manner, and are covered by an A pillar garnish (not shown) and the roof head lining 31.

Figure 10:
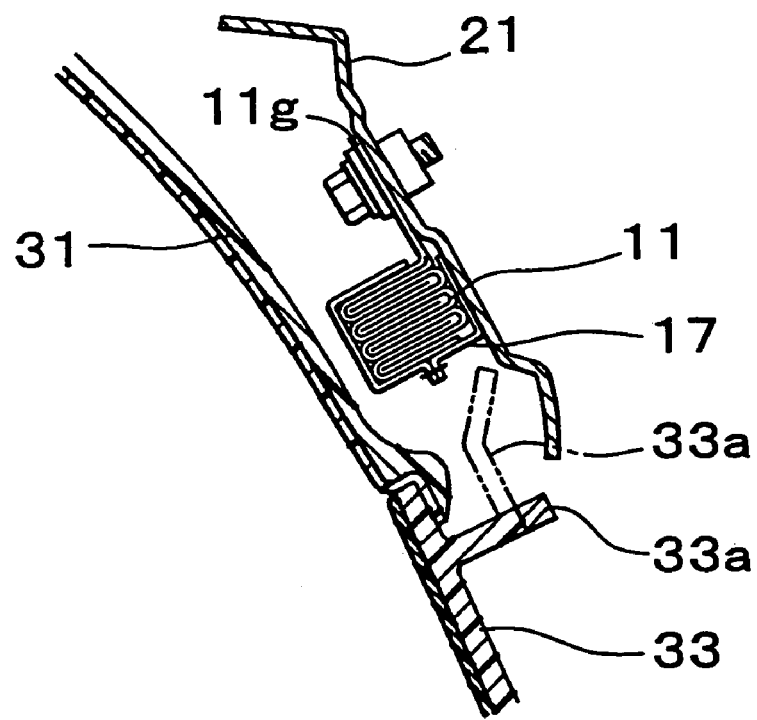
FIG. 10 is an enlarged vertical cross sectional back view obtained by vertically cross sectioning the air bag shown in FIGS. 1 and 2 at a B pillar portion in a state of folding and accommodating state.

FIG. 10 shows a cross section in a B pillar garnish 33 portion. A projection 33a for preventing the inflating and deploying air bag 11 from entering a back portion of the B pillar garnish 33 is formed on a back surface of an upper portion in the B pillar garnish 33. In this case, the projection 33a may be achieved by a shape shown by a virtual line in FIG. 10 (a shape having an inclined surface in an upward bent portion), and in this case, inflation and deployment of the air bag 11 is guided by the inclined surface so as to prevent the air bag 11 from being caught on an upper end of the B pillar garnish 33.

Further, at a time of the side collision, the roll over or the like of the vehicle, if the gas is injected out from the inflator 14 and the gas is supplied to the gas passage 11b of the air bag 11 from the shower head 13a through the diffuser pipe 13, the air bag 11 deforms the corresponding portion of the roof head lining 31 toward the inner portion of the vehicle compartment so as to deploy downward, and the tension cloth 12 deforms the corresponding portion of the A pillar garnish toward the inner portion of the vehicle compartment so as to deploy downward, whereby the air bag 11 inflates and deploys in the curtain-like shape along the side wall within the vehicle compartment as shown in FIG. 1. At this time, the respective inflating portions 11c and 11d of the air bag 11 inflate and deploy toward a head portion protecting area positioned in side portions of the head portions Hf and Hr of the respective passengers Mf and Mr.

Figure 3A:
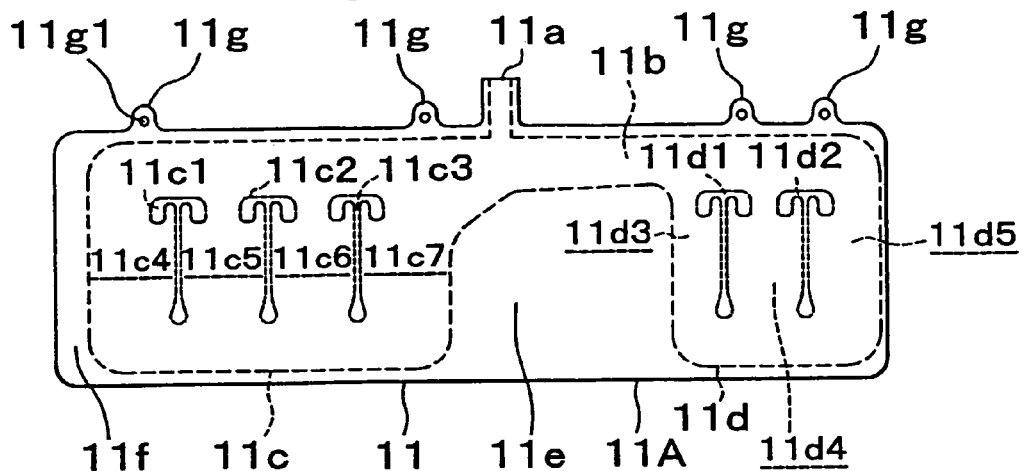
FIGS. 3A to 3C are side elevational views of three kinds of air bags including an air bag shown in FIG. 2.
Figure 3B:
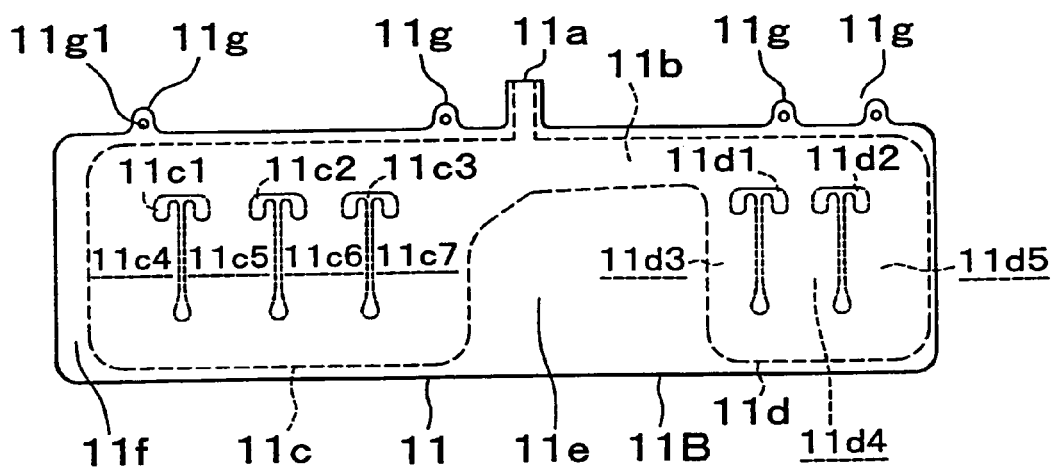
Figure 3C:
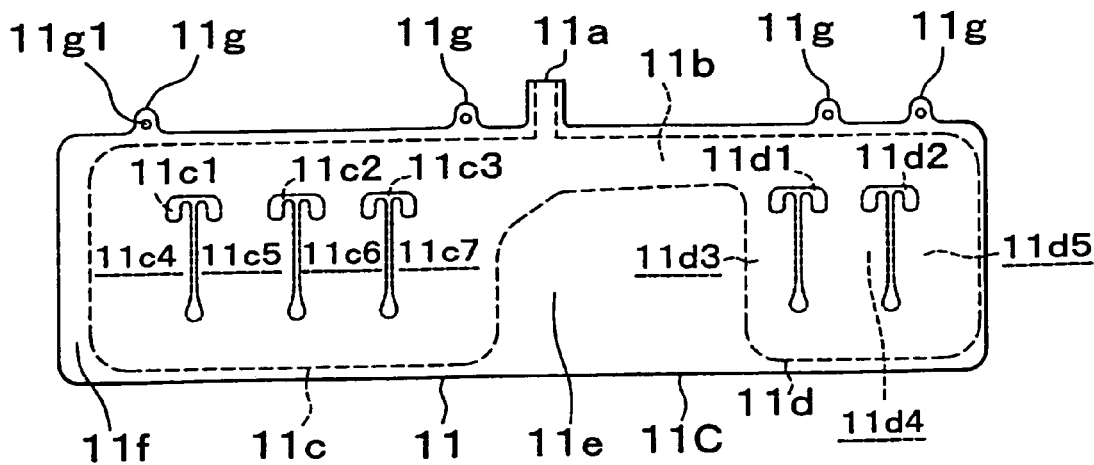
Figure 4A:
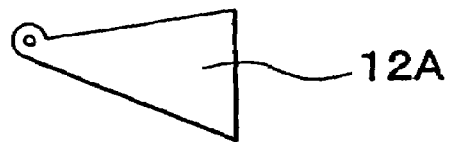
FIGS. 4A to 4C are side elevational views of three kinds of tension clothes including a tension cloth shown in FIG. 2.
Figure 4B:
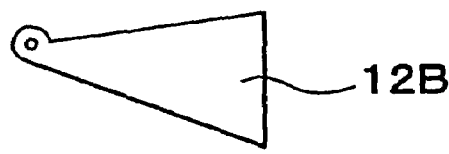
Figure 4C:
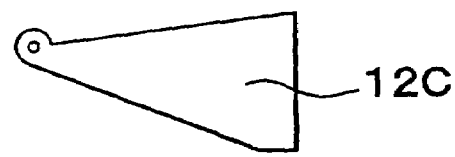

In this case, in this embodiment, one corresponding to the vehicle is selected as the air bag 11 constituting the air bag module 10 among three kinds of air bag 11A, 11B and 11C shown in FIGS. 3A to 3C, one corresponding to the vehicle is selected as the tension cloth 12 among three tension cloths 12A, 12B and 12C shown in FIGS. 4A to 4C, and the air bag 11 and the tension cloth 12 are combined with a single kind of diffuser pipe 13 (provided with the shower head 13a at the front end) shown in FIG. 5 and the inflator 14, whereby the air bag module 10 is constructed.

Three kinds of air bags 11A, 11B and 11C shown in FIGS. 3A to 3C are sorted on the basis of a distance between the front and rear seats in all the kinds of passenger cars (accurately, as shown in FIG. 1, a distance Lo between hip points of the occupants Mf and Mr sitting on the front and rear seats Sf and Sr existing at reference positions of front and rear slides, and often called as a couple distance), and have a front seat inflating portion 11c (which may be either common or different among the respective air bags 11A, 11B and 11C) covering all the protecting range in the respective front seat of a plurality of kinds of cars included in the respective kinds (three kinds), and the rear seat inflating portion 11d (which may be either common or different among the respective air bags 11A, 11B and 11C) covering all the protecting range in the respective rear seat. In this case, in FIG. 1, there is also shown a longitudinal sliding amount Lf of the front seat Sf.

The protecting range mentioned above corresponds to a range of a head portion protecting area of the occupants sitting on the respective seats at least including a petite woman (AF05) in U.S. women and a large man (AM95) in U.S. men, as shown in FIG. 2. In this case, in the front seat Sf, there are respectively shown a regular sitting position at a front most of the petite woman (AF05) and a regular sitting position at a rearmost of the large man (AM95). Further, shapes and dimensions of three kinds of tension cloths 12A, 12B and 12C shown in FIGS. 4A to 4C are set on the basis of longitudinal lengths between the respective air bags 11A, 11B and 11C and the respective A pillars 22 of a plurality of kinds of cars employing the air bags.

Accordingly, it is possible to set the constituting parts of the air bag module 10 applied to all kinds of passenger cars (there are about twenty to thirty kinds of cars in one car maker producing multiple kinds of passenger cars) to three kinds of air bags 11A, 11B and 11C, three kinds of tension cloths 12A, 12B and 12C, a single kind of diffuser pipe 18 and a single kind of inflator 14, whereby it is possible to reduce the number of the parts to be manufactured for the air bag module 10 applied to all the kinds of the passenger cars (the number of supplied parts) and it is possible to reduce a cost due to a reduction of the parts.

Further, in the air bag apparatus in accordance with this embodiment, the gas supply port 11a of the air bag 11 is provided between the front seat inflating portion 11c and the rear seat inflating portion lid, whereby it is possible to supply the gas to the front seat inflating portion 11c and the rear seat inflating portion 11d in the air bag 11 substantially at the same timing and it is possible to inflate and deploy the front seat inflating portion 11c and the rear seat inflating portion 11d in the air bag 11 substantially at the same timing for a short time. Further, in the air bag apparatus in accordance with this embodiment, since the sizes in the vertical direction of the respective air bags 11A, 11B and 11C are the same, it is possible to make the sizes in the vertical direction of all the air bag raw materials the same and it is possible to reduce the cost of the air bag itself.

Further, in accordance with this embodiment, the gas supplied from the inflator 14 is dispersed into the gas passage 11b of the air bag 11 in the three-dimensional direction (a radial direction of the shower head 13a, a dispersing direction in a gas flow direction) by the shower head 13a provided in the diffuser pipe 13. Accordingly, at an early time of inflation and deployment of the air bag 11, the gas passage 11b of the air bag 11 housed in the folded manner quickly expands in the vertical direction, whereby an area of the air bag 11 exposed to the gas pressure is increased and an effective passage area in the gas passage 11b can be sufficiently secured.

Accordingly, a part of the gas passage 11b in the air bag 11 is not put under a large load due to the supplied gas, and it is possible to restrict bag damage in the corresponding portion. Accordingly, it is not necessary to provide the protecting member against the gas pressure in the gas passage 11b of the air bag 11 (or it is possible to reduce the number of the protecting members), whereby it is possible to simplify the air bag 11, it is possible to easily fold up the air bag 11 compact, it is possible to make it easier to house the air bag 11 to the vehicle, and it is possible to reduce the cost of the air bag 11. Further, by securing an effective passage area in the gas passage 11b, it is possible to improve the gas supplying performance in the gas passage 11b, it is possible to improve the inflating and deploying performance of the air bag 11, and it is possible to reduce the inflating and deploying period of the air bag 11.

Further, in this embodiment, since the shower head 13a is formed in the semispherical shape and has a plurality of radically extending injection holes 13a1 on the spherical surface thereof, it is possible to radically inject and supply the gas so as to increase an efficiency of dispersion and supply of the gas, whereby it is also possible to increase the bag damage restricting effect of the air bag 11 and it is possible to improve the inflating and deploying performance of the air bag 11. Further, since the injection holes 13a1 of the shower head 13a are provided in symmetrical with respect to a point of the center (the axis) of the shower head 13a, the gas injecting performance can be obtained without changing even when the shower head 13a is assembled in a state of being rotated around the center thereof. Accordingly, it is possible to change the assembling direction of the shower head 13a, the diffuser pipe 13 and the inflator 14 in the vehicle with hardly changing the gas injecting performance, so that a mounting flexibility of the inflator 14 to the vehicle is increased.

Further, in accordance with this embodiment, since the shower head 13a is arranged so as to face the gas passage 11b of the air bag 11, the gas supplied from the inflator 14 is dispersed in the three-dimensional direction by the shower head 13a in the gas passage 11b of the air bag 11. Accordingly, it is possible to distribute and supply the gas toward the front seat inflating portion 11c of the rear seat inflating portion 11d of the air bag 11 accurately, and it is possible to inflate and deploy the front seat inflating portion 11c and the rear seat inflating portion 11d for a short time.

Further, in this embodiment, since the structure is made such that the shower head 13a does not protrude out within the gas passage 11b of the air bag, the fold-up of the air bag 11 is not disturbed by the shower head 13a, it is possible to fold up the air bag 11 in a compact manner, and it is not possible to make it more difficult to house the air bag 11 in the vehicle. Further, since the inflator 14 is arranged in the center portion in the longitudinal direction of the vehicle, it is possible to reduce the length of each of the gas flow passages from the inflator 14 to the front seat inflating portion 11c and the rear seat inflating portion 11d in the air bag 11, and it is possible to reduce the inflating and deploying period of the front seat inflating portion 11c and the rear seat inflating portion 11d in the air bag 11.

Further, in accordance with this embodiment, since the diffuser pipe 13 is formed substantially in the J shape, it possible to arrange the inflator 14 along the roof side rail 21 in the longitudinal direction or it is possible to arrange the inflator 14 along the roof panel 25 shown in FIG. 9 in the vehicle width direction, while keeping the air bag 11, the inflator 14 and the diffuser pipe 13 in the same structures, so that it is possible to reduce the cost due to the common use of the parts.

Further, in accordance with this embodiment, since the shower head 13a is provided at the front end of the diffuser pipe 13 assembled in the inflator 14, it is possible to correspond in the shape of the diffuser pipe 13 at a time of supplying the gas to the optimum position of the gas passage 11b in the air bag 11, whereby it is possible to commonly use the inflator 14.

Figure 11:
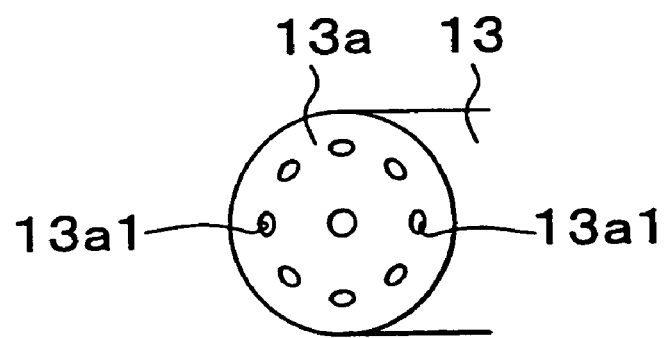
FIG. 11 is a bottom elevational view showing a modified embodiment of the shower head shown in FIG. 8.
Figure 12:
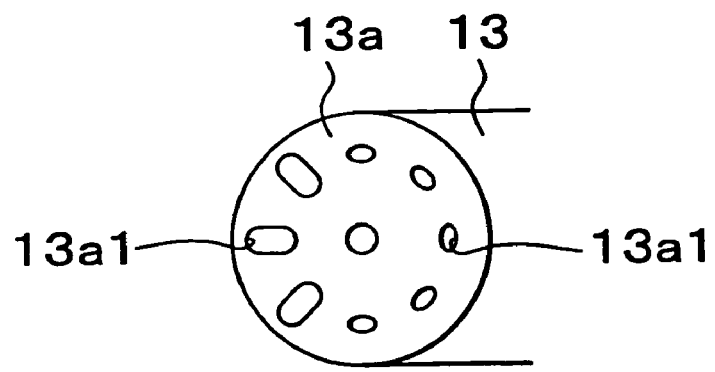
FIG. 12 is a bottom elevational view showing another modified embodiment of the shower head shown in FIG. 8.

In the embodiment mentioned above, the bag formed in accordance with the double elastic webbing is employed as the air bag 11, however, the structure can be realized by employing a sewn bag or a bonded (thermally welded) bag. Further, in the embodiment mentioned above, the structure is realized by making all of eight injection holes 13a1 provided at the uniform interval in the circumferential direction of the shower head 13a have the same diameter, however, as shown in FIGS. 11 and 12, in the case that the front seat injection holes (three injection holes 13a1 in the left side in the drawing) are made larger than the rear seat injection holes (three injection holes 13a1 in the right side in the drawing), and the opening areas thereof are set corresponding to the respective capacities of the front seat inflating portion 11c and the rear seat inflating portion 11d (a total capacity of a plurality of inflating chambers), it is possible to substantially coincide the inflating and deploying timing of the front seat inflating portion 11c with that of the rear seat inflating portion 11d in the air bag 11, whereby it is possible to reduce the period of time from starting of inflation and deployment of the air bag 11 to completing, and it is possible to improve the motion during inflating and deploying the air bag 11.

Figure 13:
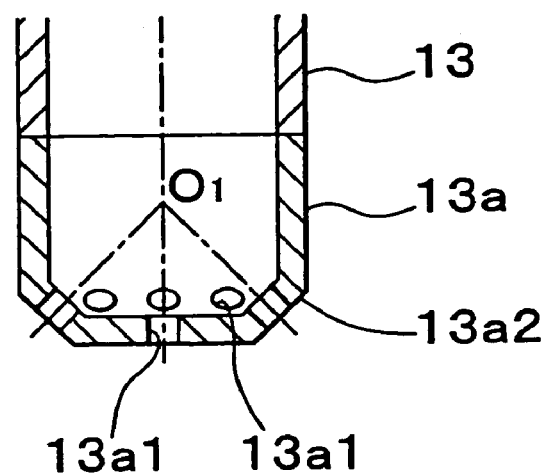
FIG. 13 is a vertical cross sectional view showing a modified embodiment of the shower head shown in FIG. 7.

Further, in the embodiment mentioned above, the shower head 13a is realized by forming in the semispherical shape, however, as shown in FIG. 13, the structure can be realized by forming the shower head 13a in a shape in which a bevel (a taper portion) 13a2 is provided at a front end, and providing a radial injection hole 13a1 therein. In this case, a diameter of the injection hole 13a1 in the center of the front end is made the same diameter as a diameter of the other injection holes 13a1.

Figure 14:
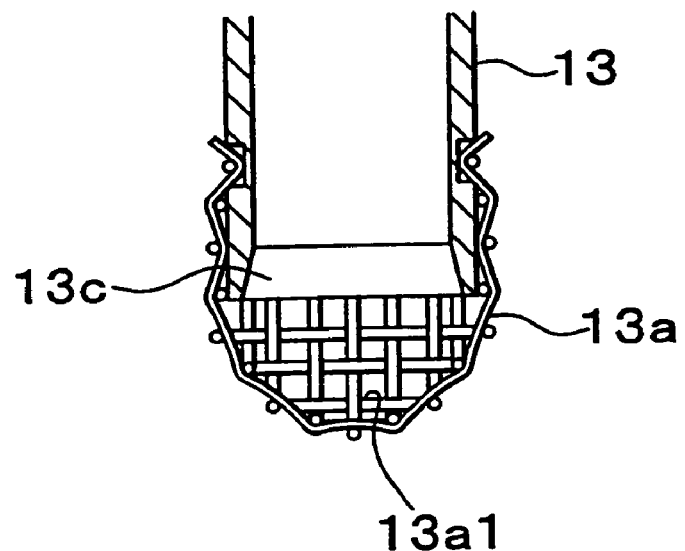
FIG. 14 is a vertical cross sectional view of an embodiment in which the shower head is formed by a mesh.
Figure 15:
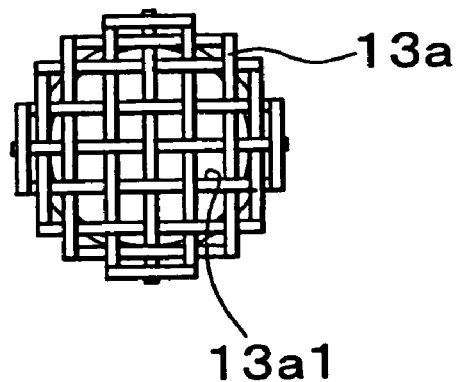
FIG. 15 is a bottom elevational view of the shower head shown in FIG. 14.
Figure 16:
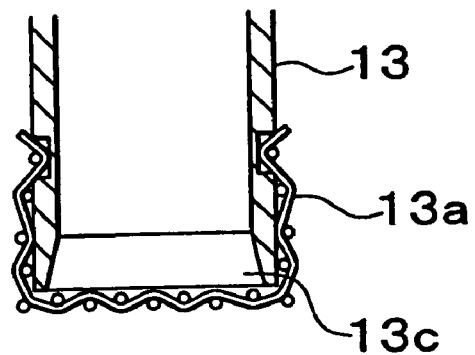
FIG. 16 is a vertical cross sectional view showing a modified embodiment of the shower head shown in FIG. 14.

Further, in the embodiment mentioned above, the structure is realized by forming the shower head 13a in the semicircular shape and providing the radial injection holes 13a1 therein, however, as shown in FIGS. 14 and 15, the structure can be made by forming a radially expanded portion 13c expanding downward at the front end of the diffuser pipe 13, forming the shower head 13a by a mesh (a metal mesh), and forming the front end portion in a substantially semicircular shape. In this case, since a webbing of the mesh forms the injection holes 13a1, it is possible to easily change and set a dispersing performance of the gas by changing an aspect (a magnitude and the number of the webbing) of the shower head 13a. Further, it is possible to inject and supply the gas with a well balance to a whole of the three-dimensional direction from the shower head 13a of the mesh formed in the substantially semispherical shape. In this case, at a time of forming the shower head 13a by the mesh (the metal mesh), the structure can be realized by forming the radially expanded portion 13c expanding downward at the front end of the diffuser pipe 13 and covering by the shower head 13a of the mesh in a planner manner, as shown in FIG. 16.

Figure 17:
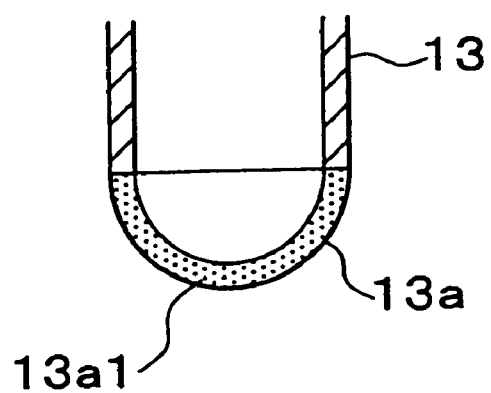
FIG. 17 is a vertical cross sectional view of an embodiment in which the shower head is formed by a porous body.
Figure 18:
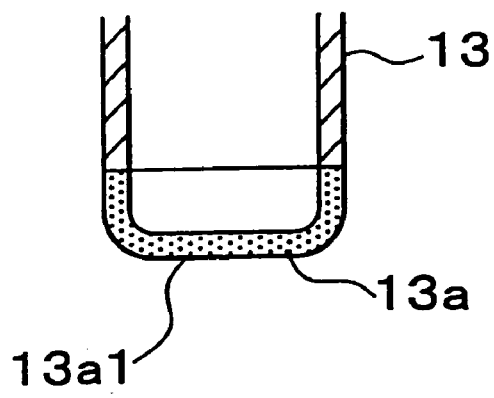
FIG. 18 is a vertical cross sectional view showing a modified embodiment of the shower head shown in FIG. 17.

Further, as shown in FIG. 17, the structure can be realized by forming the shower head 13a in a porous body capable of ventilating in a semispherical shape. In this case, since a large number of holes of the porous body form the injection holes 13a1, it is possible to easily change and set the dispersing performance of the gas by changing a raw material of the shower head 13a. Further, it is possible to inject and supply the gas with a well balance to a whole of the three-dimensional direction from the shower head 13a of the semispherical porous body. In this case, at a time of forming the shower head 13a by the porous raw material, the structure can be realized by forming in a circular plate shape.

Figure 19:
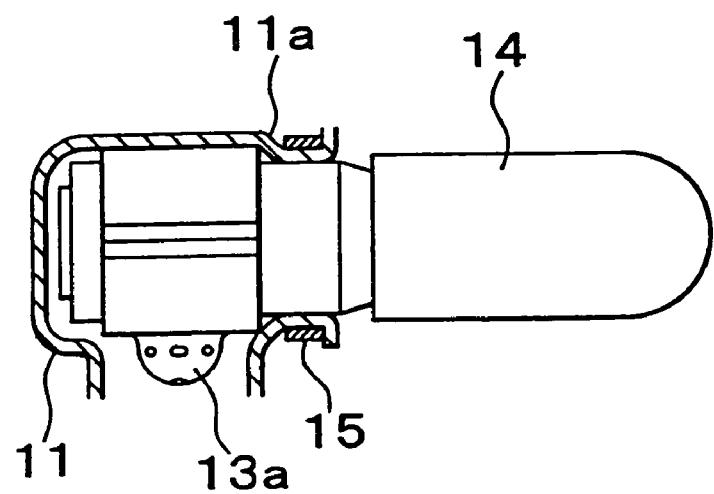
FIG. 19 is a side elevational view of an embodiment in which the shower head is integrally provided in an inflator.

Further, in the embodiment mentioned above, the structure is realized by integrally providing the shower head 13a at the front end of the diffuser pipe 13, however, as shown in FIG. 19, the structure can be realized by integrally providing the shower head 13a in the gas injection port (provided on the circumferential surface of the cylindrical inflator) of the inflator 14. In this case, it is possible to reduce the length of the gas flow passage from the inflator 14 to the gas passage 11b of the air bag 11 so as to reduce the inflating and deploying period of the air bag 11. In this case, in the embodiment shown in FIG. 19, the gas supply port 11a of the air bag 11 is assembled in an outer periphery of a middle portion of the inflator 14 in an air tight manner by using a fastening band 15.

Figure 20:
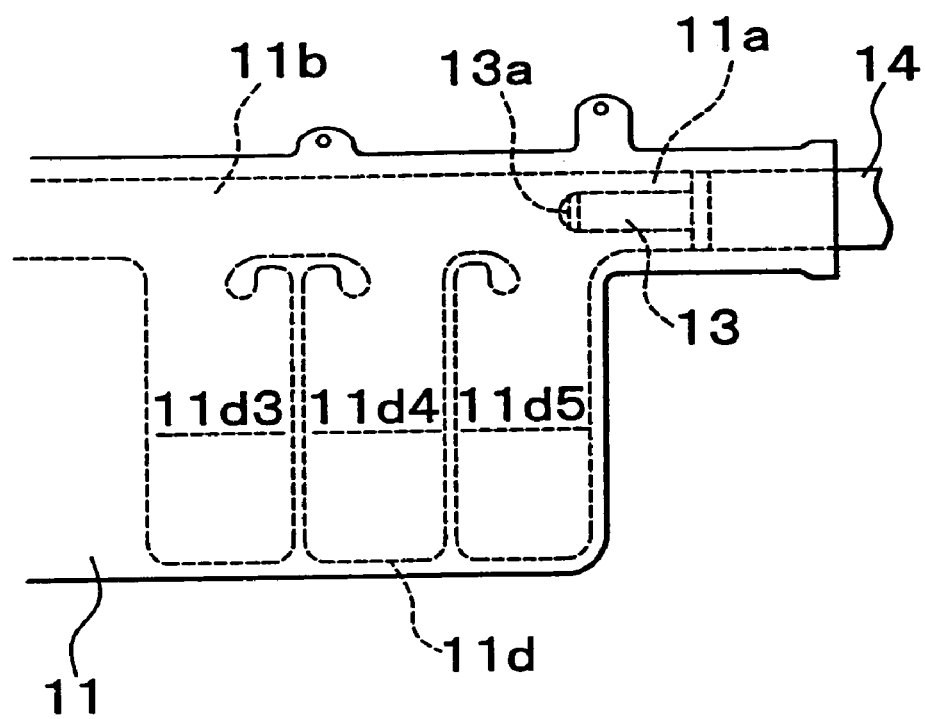
FIG. 20 is a side elevational view of an essential portion showing an embodiment in which the present invention is applied to an air bag having a gas supply port in a rear end portion.

Further, in the embodiment mentioned above, the structure is realized in the air bag 11 having the gas supply port 11a in the middle upper portion of the air bag 11, however, as shown in FIG. 20, it is a matter of course that the embodiment can be realized in an air bag having the gas supply port 11a at the rear end portion of the air bag 11, and the embodiment can be realized in an air bag (not shown) having the gas supply port at the front end portion of the air bag.

In the embodiment shown in FIG. 20, the shower head 13a provided at the front end of the linear diffuser pipe 13 is coaxially arranged with respect to the longitudinal direction of the gas passage 11b communicating with the inflating chambers (the respective inflating chambers in the front seat inflating portion and the rear seat inflating portion) in the air bag 11. Further, in the embodiment shown in FIG. 20, since the shower head 13a is arranged in the gas passage 11b at the portion communicating with an inflating chamber 11d5 at the rear end of the air bag 11, it is possible to directly supply a part of the gas dispersed in the three-dimensional direction by the shower head 13a to the inflating chamber 11d5 of the air bag 11, whereby it is possible to increase a gas dispersing effect (a bag damage reducing effect) and it is possible to reduce the inflating and deploying period of the rear seat inflating portion 11d.

Figure 21:
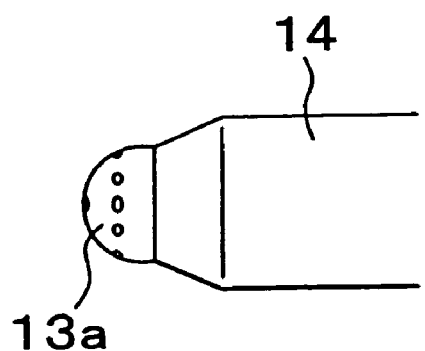
FIG. 21 is a partly side elevational view showing a modified embodiment of the embodiment in which the shower head is integrally provided in the inflator.

In the embodiment shown in FIG. 20, the shower head 13a is provided at the front end of the linear diffuser pipe 13, however, as shown in FIG. 21, the structure can be realized by omitting the diffuser pipe 13 and integrally providing the shower head 13a in the gas injection port provided in the front end portion of the cylindrical inflator 14. In this case, by omitting the diffuser pipe 13, it is possible to reduce the length of the gas flow passage from the inflator 14 to the gas passage 11b of the air bag 11, whereby it is possible to reduce the inflating and deploying period of the air bag 11. Further, by omitting the diffuser pipe 13, it is possible to make the air bag module compact and reduce the cost.

Figure 22:
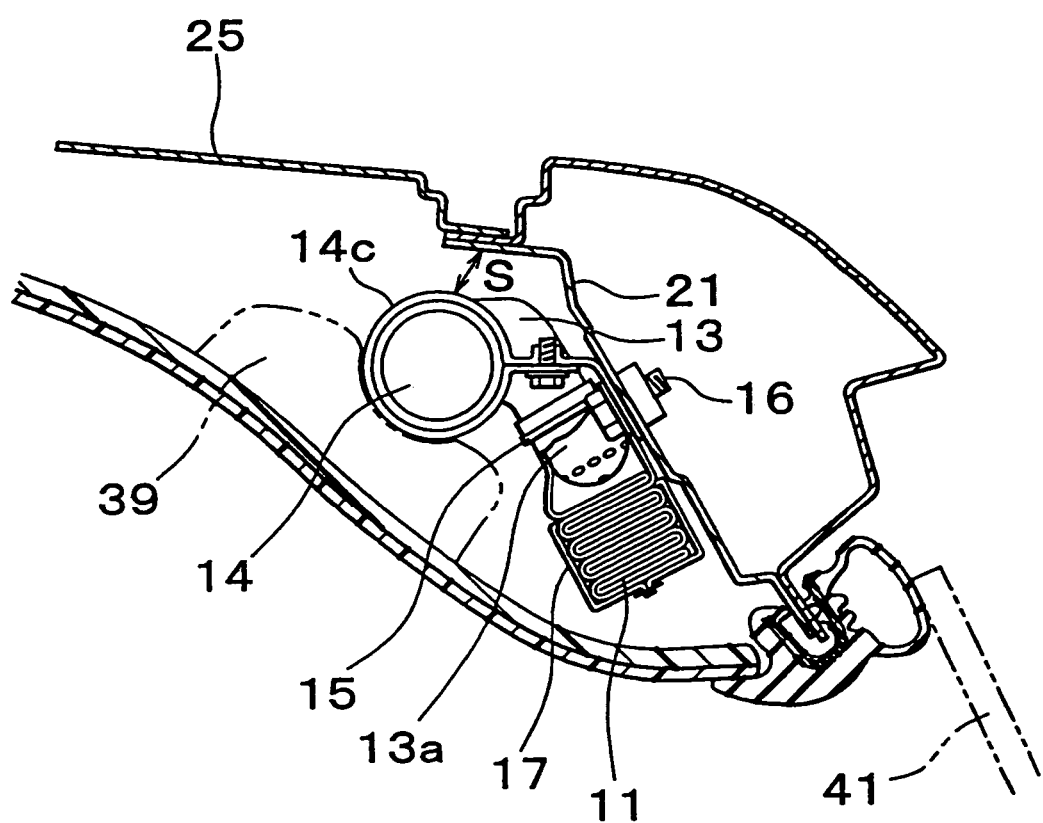
FIG. 22 is an enlarged vertical cross sectional back view corresponding to FIG. 9 showing a modified embodiment of the diffuser pipe.

Further, in the embodiment mentioned above, by employing the structure formed in the substantially J shape as the diffuser pipe 13, whereby as shown in FIG. 9, the inflator 14 is assembled in the roof side rail 21, the front end of the diffuser pipe 13 becomes substantially parallel to the door glass surface 41, however, as shown in FIG. 22, the structure can be also realized by curving the middle portion of the diffuser pipe 13 to an external side of the vehicle body (a right side in FIG. 22) at a predetermined amount and forming so that the front end of the diffuser pipe 13 becomes substantially in parallel to the door glass surface 41.

Figure 23:
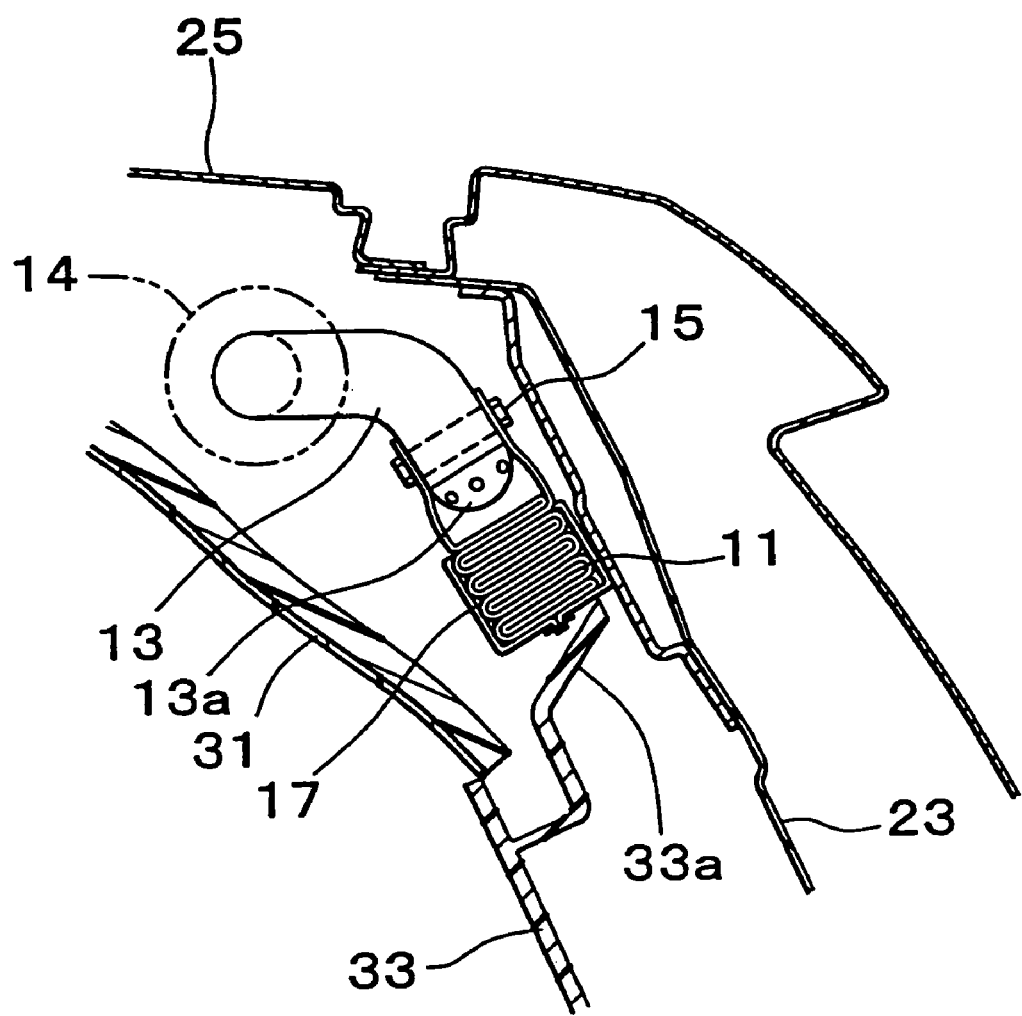
FIG. 23 is an enlarged vertical cross sectional back view obtained by vertically cross sectioning at the B pillar portion in a modified embodiment in which a front end of the diffuser pipe is arranged so as to overlap with the B pillar portion.

Further, in the embodiment mentioned above, as shown in FIG. 1, the structure is realized by forming so that the front end of the diffuser pipe 13 is arranged at a position a little to the rear of the B pillar 23, however, the arrangement of the diffuser pipe 13 can be suitably changed, and the structure can be realized by arranging so that the front end of the diffuser pipe 13 overlaps with the B pillar 23. A layout in such a case is as exemplified in FIG. 23, and in this layout, an inclined surface of a projection 33a provided in the B pillar garnish 33 is arranged so as to oppose to the front end portion of the diffuser pipe 13.

Figure 24:
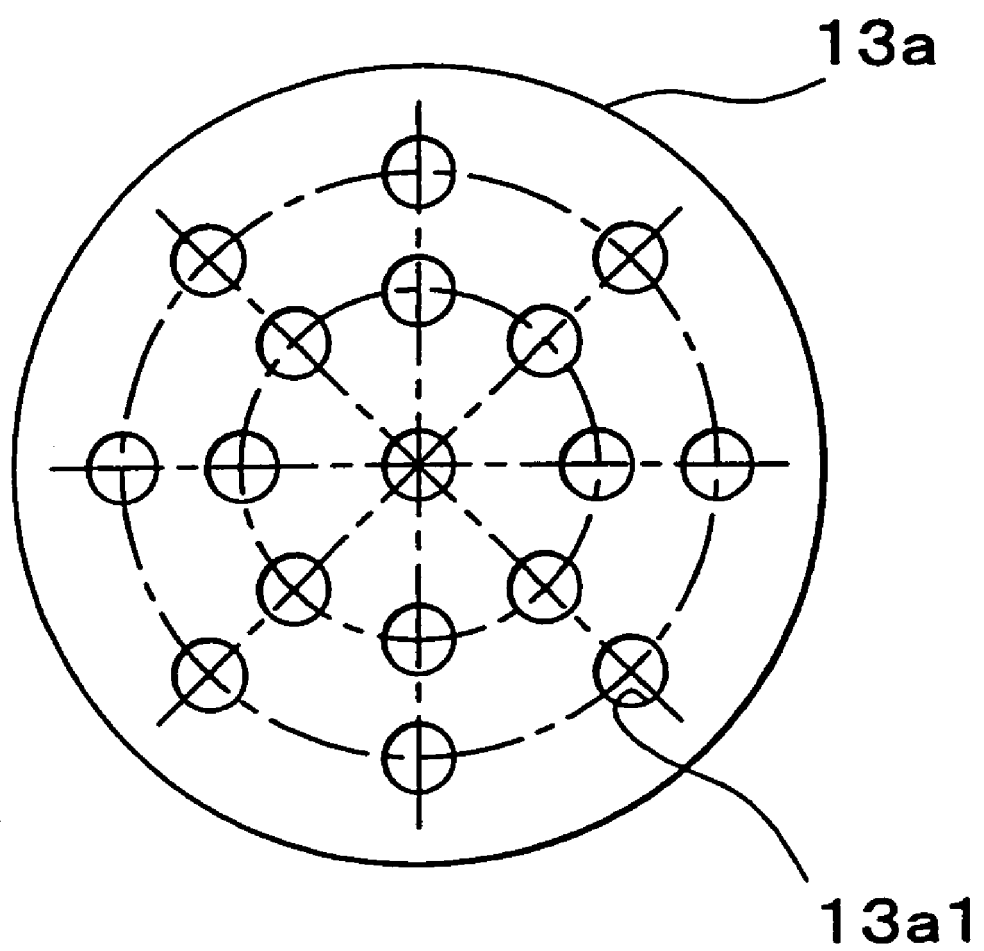
FIG. 24 is a bottom elevational view of an embodiment in which a plurality of injection holes are concentrically arranged in the shower head so as to form a plurality of lines.
Figure 25:
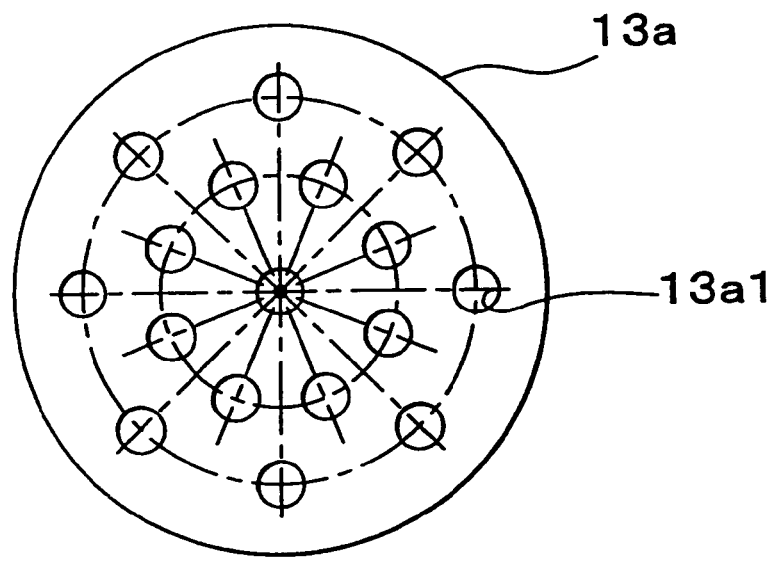
FIG. 25 is a bottom elevational view of an embodiment in which a plurality of injection holes are concentrically arranged in the shower head so as to form a plurality of lines and inner and outer injection holes adjacent to each other in a radial direction are arranged so as to form a zigzag shape in a circumferential direction.

Further, in the embodiment mentioned above, at a time of providing a plurality of injection holes 13a1 in the shower head 13a, the structure is realized by providing one hole in the center of the front end and eight holes in the circumferential direction in one line, for example, as shown in FIG. 8, however, the structure can be realized by forming the shower head 13a, for example, in a closed-end cylindrical shape (can be realized by forming in the other polygonal tubular shape than the cylindrical shape) and providing a plurality of injection holes 13a1 in a bottom wall thereof (which may be flat or spherical) in a manner shown in FIG. 24 or 25. In this case, the respective injection holes 13a1 in FIGS. 24 and 25 have the same diameter.

In the embodiment shown in FIG. 24, a plurality of injection holes 13a1 are concentrically provided with respect to the center of the front end of the shower head 13a in a two-line arrangement so that the respective lines include eight holes, and one hole is provided in the center of the front end of the shower head 13a. The arrangement in two lines in FIG. 24 may be replaced by an arrangement having three lines or more, and the number of the holes in each of the lines is not limited to eight and can be suitably increased and reduced. Accordingly, in the embodiment mentioned above, it is possible to suitably set the gas dispersing effect on the basis of the arrangement of the injection holes 13a1 and it is possible to reduce the bag damage and improve the gas supplying efficiency with a good balance.

On the contrary, in the embodiment shown in FIG. 25, inner and outer injection holes 13a1 concentrically arranged in two lines and being adjacent to each other in a radial direction are arranged in a zigzag manner in a circumferential direction (alternately arranged along inner and outer circumferences in the circumferential direction so as not to coincide radially as shown in FIG. 24). Accordingly, in the embodiment mentioned above, it is possible to prevent an interference at a time when the gas is injected from the inner and outer injection holes 13a1 concentrically arranged in two lines and being adjacent to each other in the radial direction, and it is possible to disperse the gas with a good balance from the respective injection holes 13a1 of the shower head 13a to the gas passage 11b of the air bag 11, whereby it is possible to further reduce the bag damage and improve the gas supplying efficiency.

Figure 26:
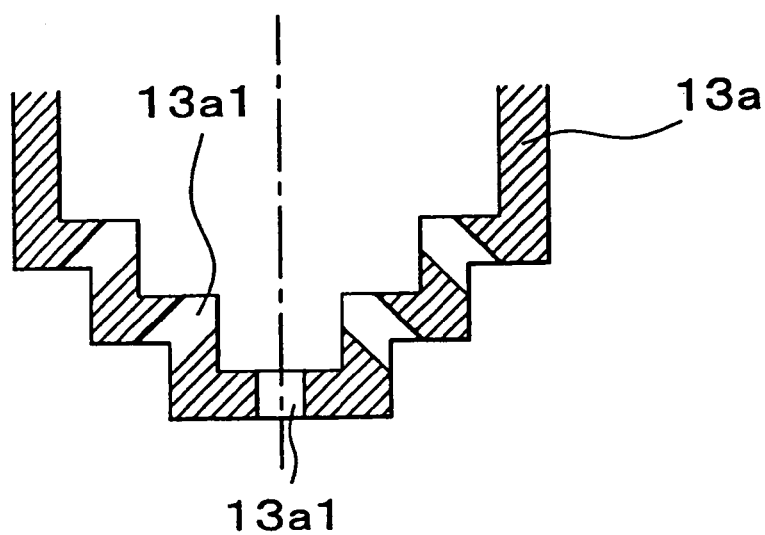
FIG. 26 is a vertical cross sectional side view of an embodiment in which the shower head is formed in a stepped shape having multiple steps having smaller diameter toward a front end, and a plurality of injection holes are obliquely formed in the respective step portions.
Figure 27:
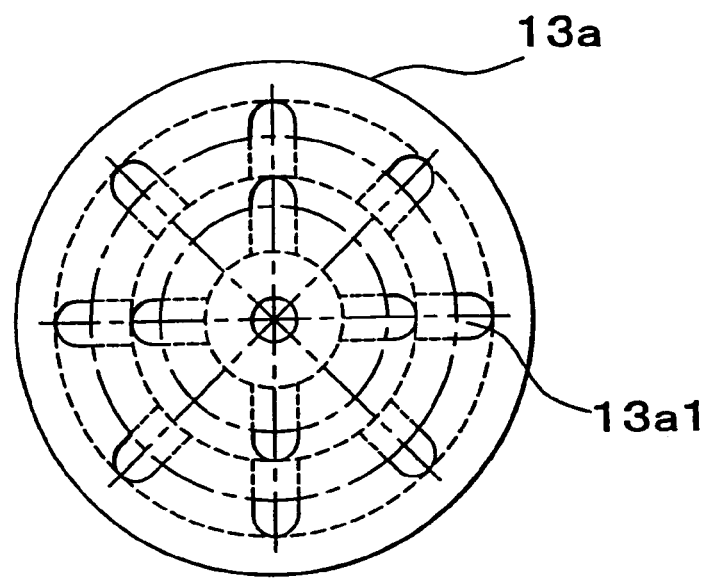
FIG. 27 is a bottom elevational view of the embodiment shown in FIG. 26.
Figure 28:
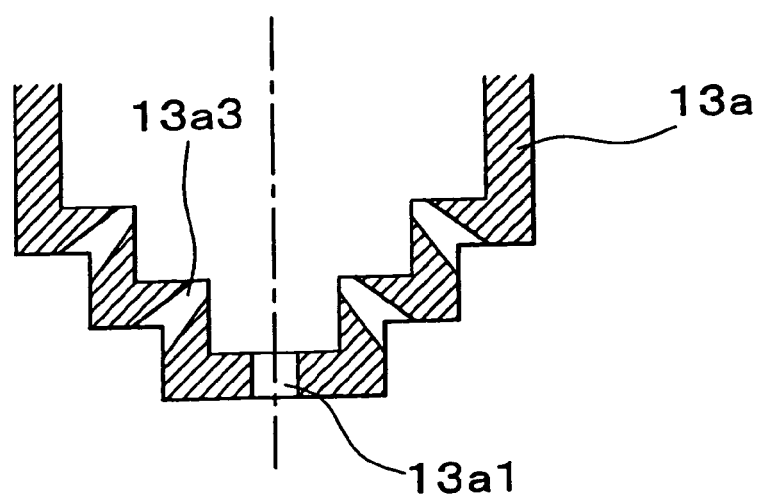
FIG. 28 is a vertical cross sectional side view of an embodiment in which the shower head is formed in a stepped shape having multiple steps having smaller diameter toward the front end, and a plurality of injection holes are formed in the respective step portions in a fan shape expanding toward the front end.
Figure 29:
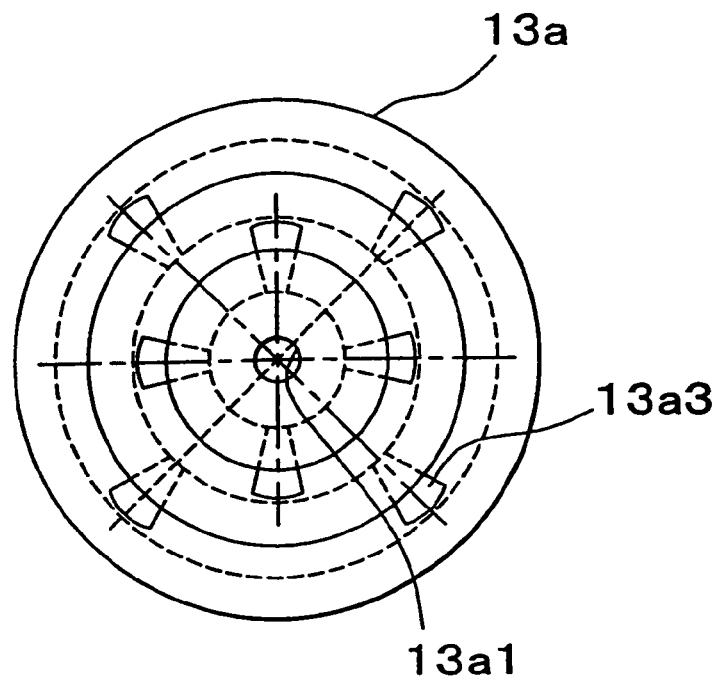
FIG. 29 is a bottom elevational view of the embodiment shown in FIG. 28.
Figure 30:
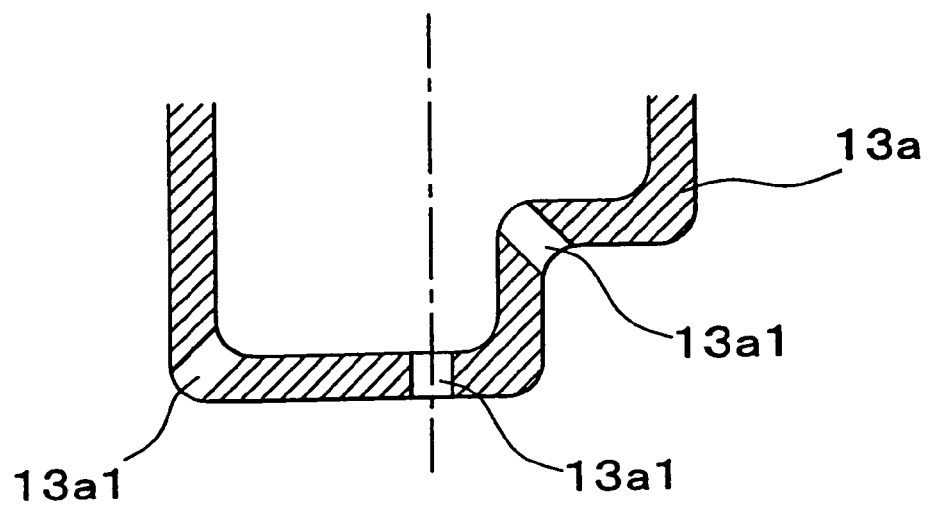
FIG. 30 is a vertical cross sectional side view of an embodiment in which the front end of the shower head is formed in an asymmetrical shape with respect to a center axis thereof, and the injection holes are formed on the asymmetrical surface.

Further, in the embodiment mentioned above, as shown in FIGS. 6 to 8, the structure is realized by forming the shower head 13a in the semispherical shape, however, as shown in FIGS. 26 and 27, or as shown in FIGS. 28 and 29, the structure can be realized by forming the shower head 13a in a closed-end stepped cylindrical shape (the other polygonal tubular shapes than the cylindrical shape may be employed) having multiple stages becoming smaller toward the front end, or as shown in FIG. 30 by forming the front end of the shower head 13a in an asymmetrical shape with respect to the center axis thereof, and providing a plurality of injection holes 13a1 (13a1 and 13a3 in FIGS. 28 and 29) on a bottom wall thereof.

In the embodiment shown in FIGS. 26 and 27, the injection hole 13a1 is formed in the center of the front end on a bottom wall (a stepped bottom wall having two stages) of the shower head 13a in an axial direction, and a plurality of injection holes 13a1 (having the same diameter as that of the injection hole 13a1 in the center of the front end) are formed in the respective step portions formed on the bottom wall in an inclined manner. In the embodiment mentioned above, since the shower head 13a is formed in the stepped shape having the multiple stages having the diameter reduced toward the front end, it is possible to secure the gas pressure within the front end of the shower head 13a, it is possible to level the gas pressure at a time when the gas flows into the respective injection holes 13a1, and it is possible to level the gas flow flowing through the respective injection holes 13a1. Further, by forming a plurality of injection holes 13a1 in the respective step portions in the inclined manner, it is possible to concentrically form a substantially conical gas flow expanding downward in a multiple manner, and it is possible to diffuse the gas flow with a good balance. Further, in the outlet of each of the injection holes 13a1, the gas flow is rectified due to a restriction of diffusion (dispersion) performed by the stepped wall surface having an L-shaped cross section, and flows in a desired direction at a desired angle of diffusion.

On the contrary, in the embodiment shown in FIGS. 28 and 29, the injection hole 13a1 having a complete round shape is formed in the center of the front end of the wide wall in the shower head 13a in an axial direction, and a plurality of injection holes 13a3 having a fan shape expanded in an axial direction and a circumferential direction toward the front end (a fan shape expanded in any one direction may be employed) are formed in the respective step portion formed on the bottom wall in an inclined manner. In the embodiment mentioned above, a pressure loss due to a shearing resistance (a wall surface resistance) is increased in comparison with the injection hole having the complete round shape (the injection hole 13a1 in accordance with the embodiment shown in FIGS. 26 and 27) in the fan-shaped injection holes 13a3, and the angle of diffusion of the gas flow is enlarged. Accordingly, by suitably setting the angle of opening of the fan shape, it is possible to adjust the gas flow so as to adjust the deploying property and the directivity of the air bag 11.

Further, in the embodiment shown in FIG. 30, the injection hole 13a1 is formed in the axial direction in the center of the front end on the bottom wall of the shower head 13a, and a plurality of injection holes 13a1 (having the same diameter as that of the injection hole 13a1 in the center of the front end) are respectively formed on an asymmetrical surface thereof in an inclined manner. In the embodiment mentioned above, by suitably setting an asymmetrical front end shape of the shower head 13a, it is possible to adjust the gas flow so as to adjust the deploying property and the directivity of the air bag 11.

Figure 31:
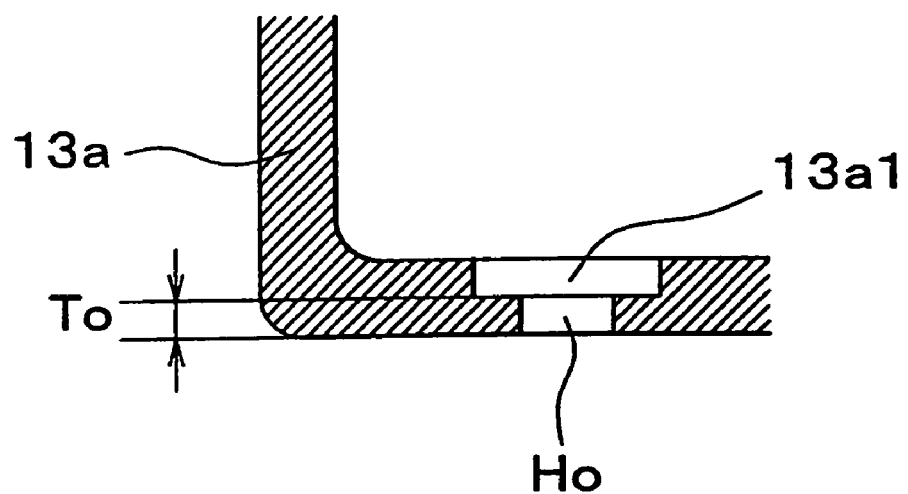
FIG. 31 is a vertical cross sectional side view of an embodiment in which the injection hole is formed in the stepped shape and a thickness of a minimum hole portion is reduced.

The respective injection holes 13a1 mentioned above (the injection holes having the complete round shape) can be realized by forming in the stepped shape in which a back portion has a large diameter and reducing a thickness To of a minimum hole portion Ho, as exemplified in FIG. 31. In accordance with the embodiment mentioned above, it is possible to reduce the pressure loss in the injection holes 13a1 while securing the strength required for the shower head 13a. Further, by changing the thickness To of the minimum hole portion Ho (a length of the minimum hole), it is possible to adjust the amount of the pressure loss.

Figure 32:
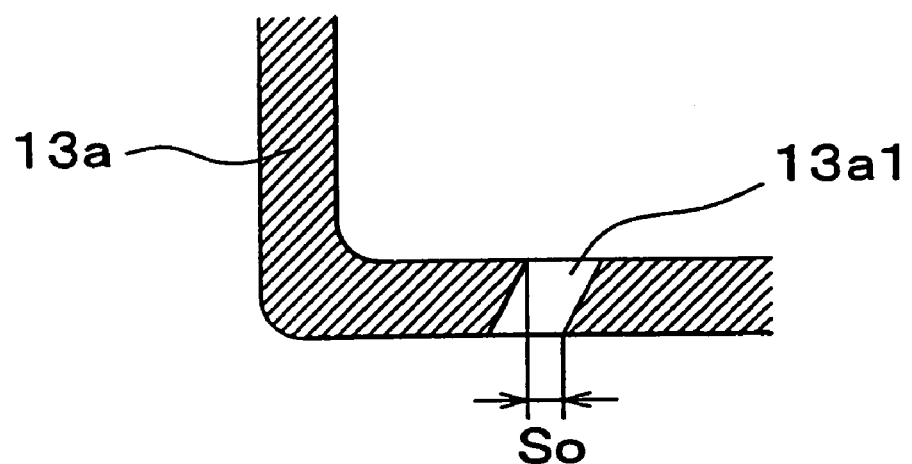
FIG. 32 is a vertical cross sectional side view of an embodiment in which the injection hole formed in the front end wall of the shower head is inclined with respect to the wall surface of the front end wall.

Further, the respective injection holes 13a1 mentioned above (the injection holes having the complete round shape) can be realized by inclining with respect to the wall surface of the front end wall at a time of being formed on the front end wall (the bottom wall) of the shower head 13a, as exemplified in FIG. 32. In the embodiment mentioned above, an apparent opening area So of the inclined injection hole 13a1 is reduced and the amount of pressure loss is increased. Further, it is possible to adjust the gas flow by changing the distribution and the angle of incline of the inclined injection holes 13a1, and it is also possible to adjust the deploying property and the directivity of the air bag 11.

Figure 33:
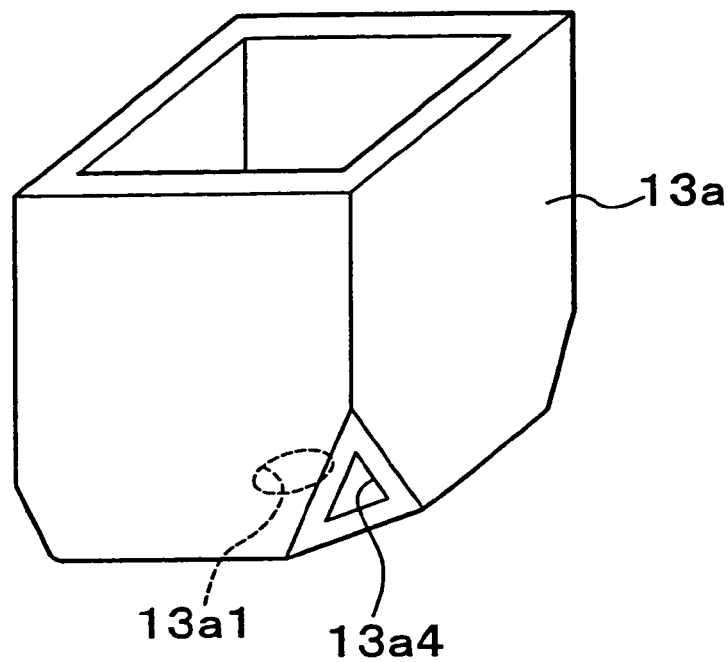
FIG. 33 is a perspective view of an embodiment in which the shower head is formed in a closed-end polygonal tube shape, the injection holes are formed in the front end wall of the shower head, and the injection holes are formed so as to ride over the front end portion and a peripheral wall of the shower head.

Further, the structure can be realized by forming the shower head 13a in a closed rectangular tubular shape (the other closed-end polygonal tubular shapes or closed-end cylindrical shapes may be employed) as exemplified in FIG. 33, forming the injection hole 13a1 having the complete round shape in the center of the front end wall in the shower head 13a and forming four injection holes 13a4 having a substantially triangular shape so as to ride over the front end wall of the shower head 13a and the circumferential wall. In accordance with the embodiment mentioned above, it is possible to disperse (diffuse) the gas in multiple directions on the basis of a simple shape (structure). Further, the injection holes 13a4 having the substantially triangular shape riding over the front end wall and the circumferential wall in the shower head 13a can be easily formed by obliquely cutting the front end of the shower head 13a, whereby it is possible to easily manufacture the shower head 13a and it is possible to reduce the cost of the shower head 13a.

Figure 34:
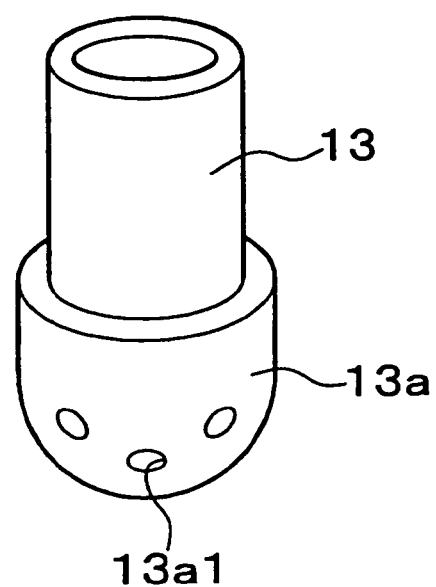
FIG. 34 is a perspective view of an embodiment in which a diameter of the front end portion of the diffuser is made smaller, and the shower head is fitted and fixed to an outer periphery of the front end portion in the diffuser pipe.
Figure 35:
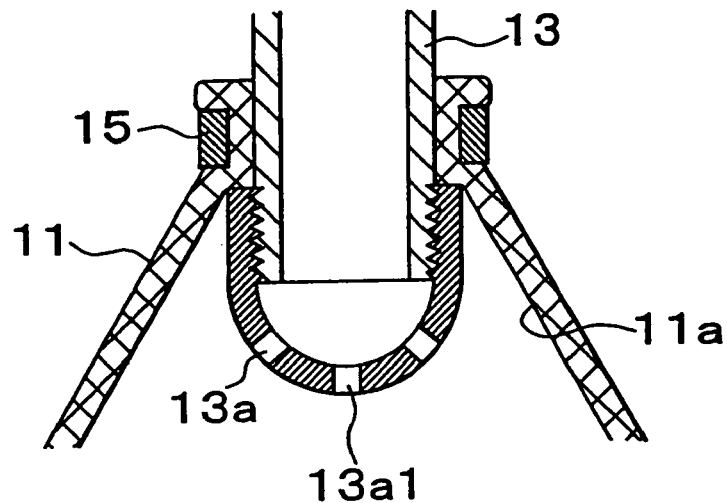
FIG. 35 is a vertical cross sectional side view of an embodiment in which a gas supply port forming portion of the air bag is fixed to a step portion formed by the front end portion of the diffuser pipe shown in FIG. 34 and a step portion formed by the shower head.

Further, in the embodiment mentioned above, as shown in FIGS. 6 to 8, the structure is realized by forming so that the inner diameter and the outer diameter of the upper end portion in the shower head 13a become substantially equal to the inner diameter and the outer diameter of the lower end portion in the diffuser pipe 13, and connecting them in accordance with a welding or the like. However, as shown in FIGS. 34 and 35, the structure can be realized by forming so that the inner diameter and the outer diameter of the lower end portion (the front end portion) in the diffuser pipe 13 become smaller than the inner diameter and the outer diameter of the upper end portion in the shower head 13a, and fitting and fixing the shower head 13a to an outer circumference of the lower end portion in the diffuser pipe 13 for example, in accordance with a spring fastening (or a caulking, a welding or the like). In accordance with the embodiment mentioned above, by replacing the shower head 13a, it is possible to easily change the gas dispersing property, for example, corresponding to the shape, the magnitude or the like of the air bag 11. Further, since the shower head 13a can be manufactured independently, it is easy to work the injection hole 13a1 with respect to the shower head 13a and it is possible to widely reduce the cost since the common use of the diffuser pipe 13 is possible Further, in the embodiment structured such that in a state that the diffuser pipe 13 and the shower head 13a shown in FIGS. 34 and 35 are employed, the gas supply port 11a forming portion of the air bag 11 is fixed to the step portion formed by the front end portion of the diffuser pipe 13 and the shower head 13a by using a fastening band 15 as shown in FIG. 35, it is possible to fix the diffuser pipe 13 and the shower head 13a to the air bag 11 by effectively utilizing the step portion formed by the diffuser pipe 13 and the shower head 13a, whereby it is possible to improve an assembling operability and a fixing strength.

Figure 36:
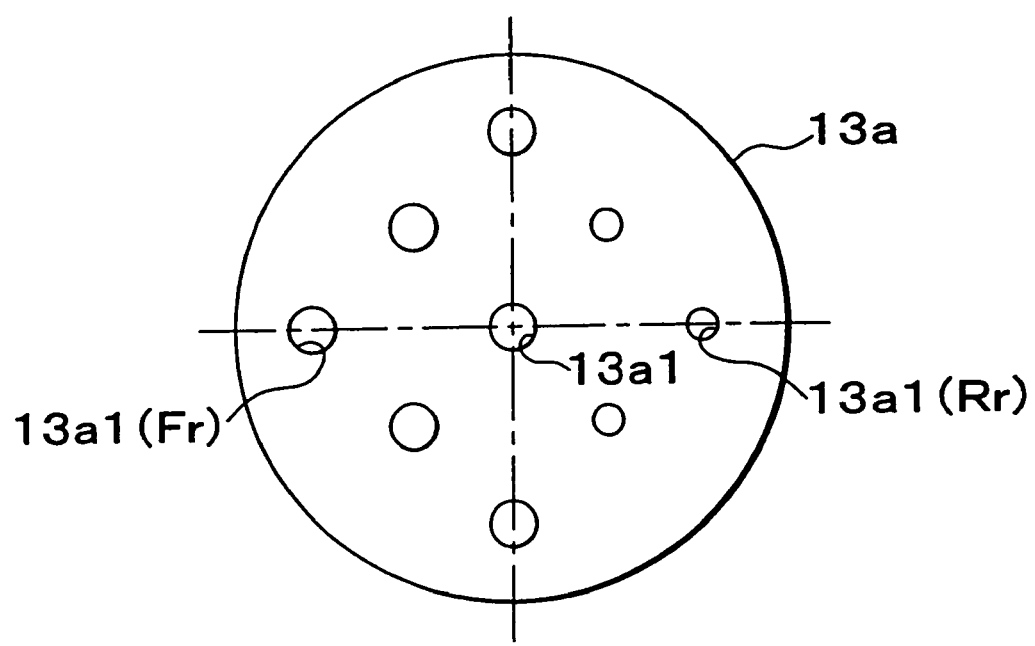
FIG. 36 is a bottom elevational view of an embodiment in which hole diameters are made different between an injection hole for a front seat and an injection hole for a rear seat which are provided in the shower head.
Figure 37:
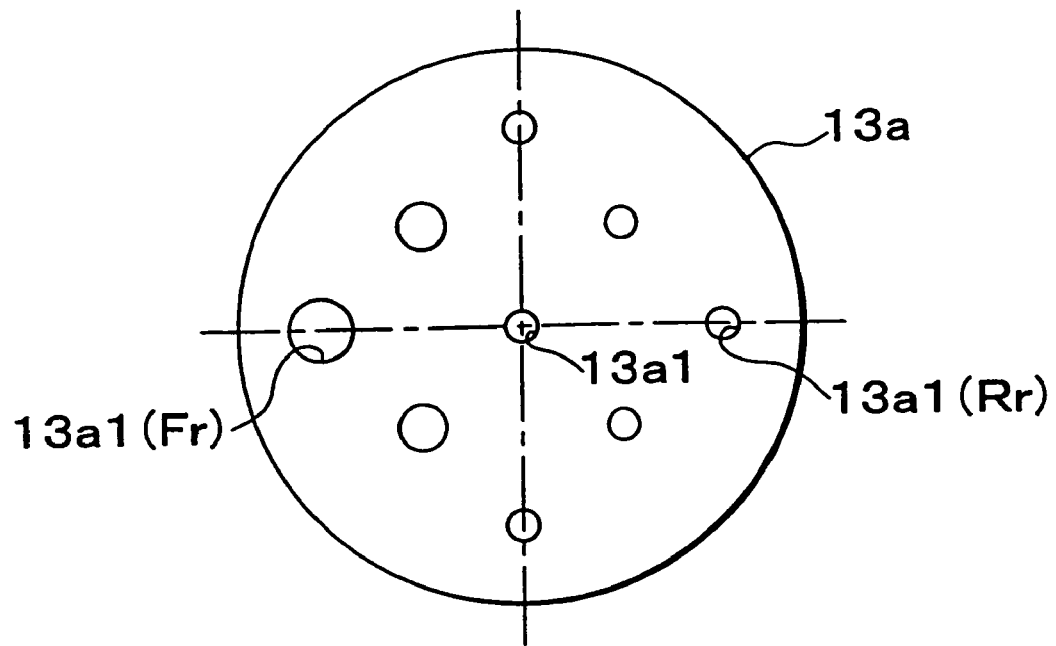
FIG. 37 is a bottom elevational view of an embodiment in which the front seat injection hole and the rear seat injection hole which are provided in the shower head are respectively constituted by a plurality of injection holes, and a hole diameter of the front seat injection holes is gradually reduced toward the center of the front end in the shower head.
Figure 38:
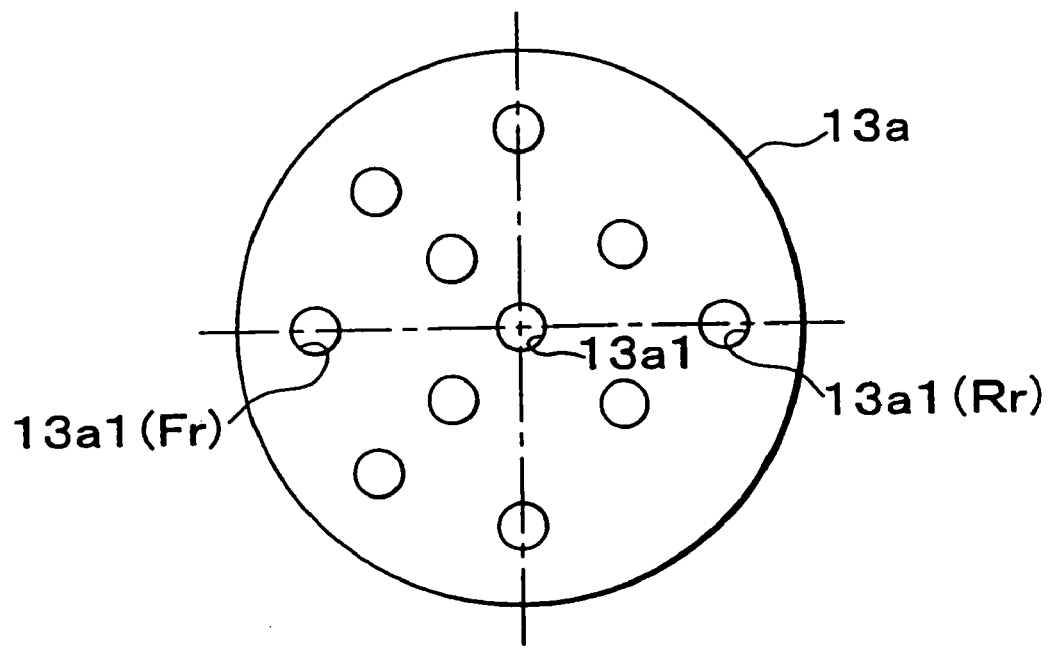
FIG. 38 is a bottom elevational view of an embodiment in which the number of the front seat injection holes provided in the shower head is made more than the number of the rear seat injection holes.

Further, in the embodiment mentioned above, the structure is realized by providing in a symmetrical with respect to the longitudinal direction (the lateral direction in the drawing), for example, as shown in FIG. 8, at a time of providing with a plurality of injection holes 13a1 in the shower head 13a, however, as shown in FIG. 36, 37 or 38, the structure can be realized by providing with a plurality of injection holes 13a1 in an asymmetrical with respect to the longitudinal direction (the lateral direction in the drawing).

In the embodiment shown in FIG. 36, a hole diameter (having the same diameter as that of the injection hole 13a1 in the center of the front end) of three front seat injection holes 13a1 (Fr) provided in a left side of the drawing is made larger than a hole diameter of three rear seat injection holes 13a1 (Rr) provided in a right side of the drawing, and the opening areas of the respective three front seat injection holes 13a1 (Fr) and rear seat injection holes 13a1 (Rr) (an opening area Sf of the front seat injection holes and an opening area Sr of the rear seat injection holes) are set corresponding to the capacities of the inflating chambers of the front seat inflating portion 11c and the rear seat inflating portion 11d in the air bag 11.

In the embodiment mentioned above, it is possible to substantially coincide the inflating and deploying timing of the front seat inflating portion 11c with that of the rear seat inflating portion 11d in the air bag 11 without increasing man hour for working the respective injection holes 13a1, 13a1 (Fr) and 13a1(Rr) in the shower head 13a, so as to reduce the time from starting inflation and deployment of the air bag 11 until completion at a low cost, and it is possible to improve the motion during inflating and deploying the air bag 11.

On the contrary, in the embodiment shown in FIG. 37, the hole diameter (larger than the hole diameter of the injection hole 13a1 in the center of the front end) of three front seat injection holes 13a1(Fr) provided in the left side in the drawing is gradually reduced toward the center of the front end in the shower head 13a (in particular, one at a left end has a large diameter and two rightward thereof have middle diameters). In the embodiment mentioned above, it is possible to gradually reduce the injected gas flow corresponding to the hole diameter of the injection hole 13a1(Fr) in the left side in the drawing, it is possible to permit the gas to have a directivity, and it is possible to adjust the motion during inflating and deploying the air bag 11. In this case, in the embodiment shown in FIG. 37, the hole diameter of three rear seat injection holes 13a1(Rr) provided in the right side in the drawing is set to be equal to the hole diameter of the injection hole 13a1 in the center of the front end.

Further, in the embodiment shown in FIG. 38, the number (five) of the front seat injection holes 13a1(Fr) provided in the left side in the drawing is set to be larger than the number (three) of the front seat injection holes 13a1(Fr) provided in the right side in the drawing, and the opening areas of the front seat injection holes 13a1(Fr) and the rear seat injection holes 13a1(Rr) (the opening area Sf of the front seat injection holes and the opening area Sr of the rear seat injection holes) are set corresponding to the capacities of the inflating chambers of the front seat inflating portion 11c and the rear seat inflating portion 11d in the air bag 11 (set to Sf>Sr). Further, the hole diameter of the respective front seat injection holes 13a1(Fr) and the hole diameter of the respective front seat injection holes 13a1(Fr) are set to be equal to the hole diameter of the injection hole 13a1 in the center of the front end.

In the embodiment mentioned above, it is possible to substantially coincide the inflating and deploying timing of the front seat inflating portion 11c with that of the rear seat inflating portion 11d in the air bag 11 by working (working so as to increase the number of the injection holes in a side of increasing the opening area) the respective injection holes 13a1, 13a1(Fr) and 13a1(Rr) in the shower head 13a by the same tool, it is possible to reduce the period of time from starting inflation and deployment of the air bag 11 until completion, while reducing the bag damage due to an increase of the number of the injection holes (a reduction of the gas flow speed), and it is also possible to improve the motion during inflating and deploying the air bag 11.

Figure 39:
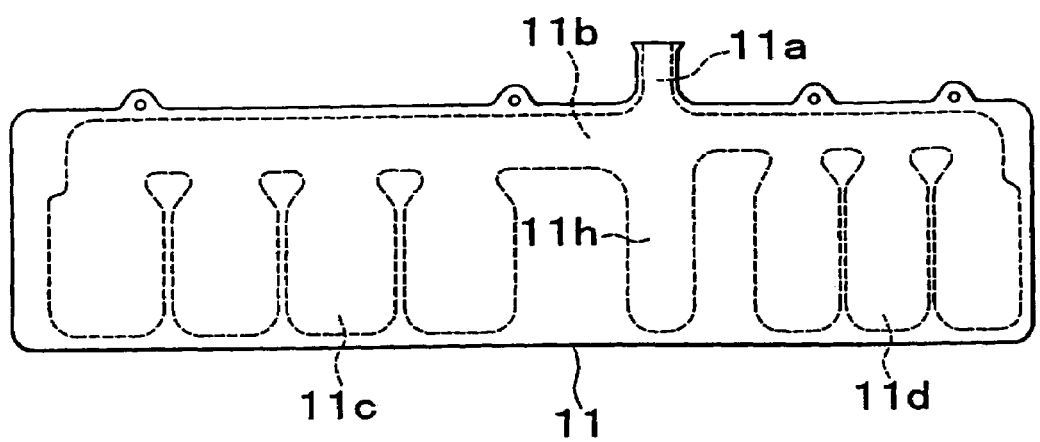
FIG. 39 is a side elevational view of an embodiment in which an auxiliary inflating chamber communicating with the gas passage of the air bag at an upper end below the front end of the shower head and extending in a vertical direction is provided in the air bag.
Figure 40:
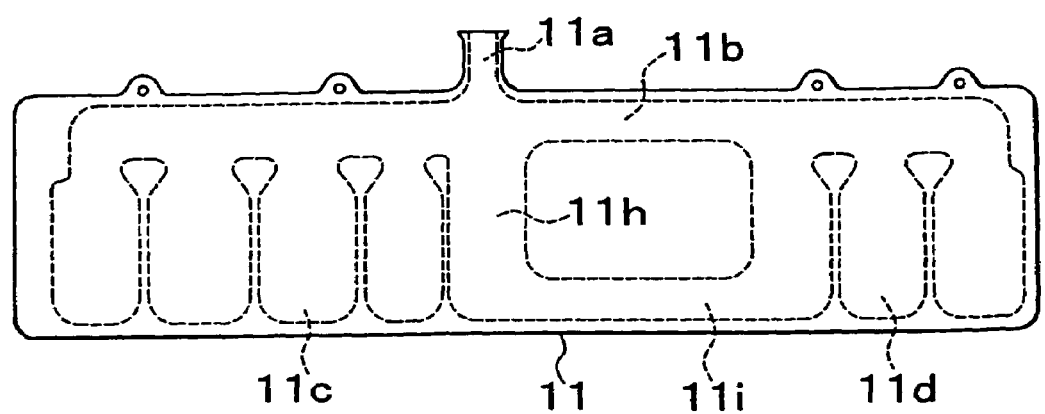
FIG. 40 is a side elevational view of an embodiment in which a lower end of the auxiliary inflating chamber provided in the air bag is communicated with the rear seat inflating portion.
Figure 41:
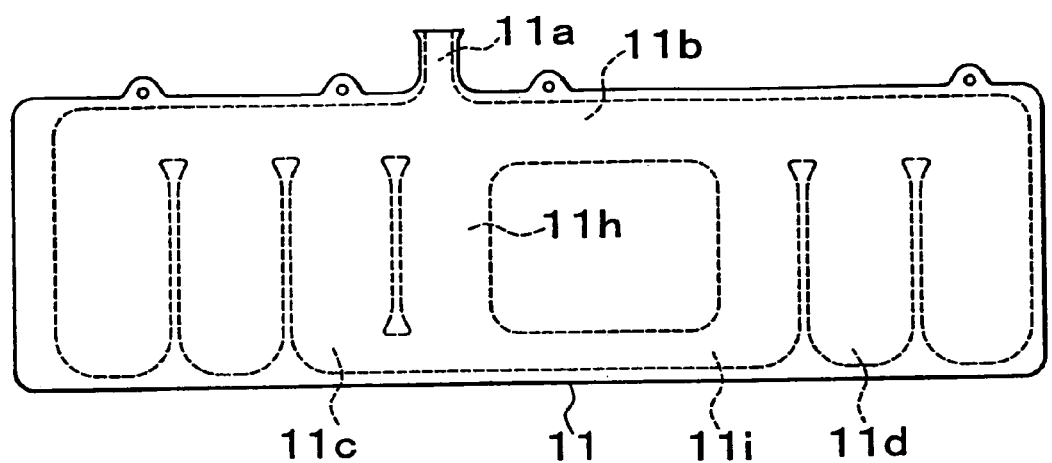
FIG. 41 is a side elevational view of an embodiment in which the lower end of the auxiliary inflating chamber provided in the air bag is communicated with the front seat inflating portion and the rear seat inflating portion.

Further, in the embodiment mentioned above, as shown in FIGS. 1 and 2, the structure is realized by forming so that the inflating chamber is not provided below the front end of the shower head 13a (immediately below the gas supply port 11a) in the air bag 11, however, as shown in FIG. 39, 40 or 41, the structure can be realized by forming so that an auxiliary inflating chamber 11h is provided immediately below the gas supply port 11a (below the front end of the shower head) in the air bag 11. In this case, in the air bag 11 shown in FIG. 39, 40 or 41, the respective inflating chambers (cells) of the front seat inflating portion 11c and the rear seat inflating portion 11d are communicated with the gas passage 11b only at the upper end.

In the embodiment shown in FIG. 39, the auxiliary inflating chamber 11h of the air bag 11 is communicated with the gas passage 11b at the upper end immediately below the gas supply port 11a (below the front end of the shower head) so as to be extended in the vertical direction). In the embodiment mentioned above, the gas flows to the auxiliary inflating chamber 11h of the air bag 11 during inflating and deploying the air bag 11, thereby promoting the air bag 11 to deploy downward. Accordingly, it is possible to reduce the period of time until completing the deployment of the air bag 11.

On the contrary, in the embodiment shown in FIG. 40, as well as the gas supply port 11a of the air bag 11 is provided so as to be displaced forward in comparison with FIG. 39, the auxiliary inflating chamber 11h is provided close to the front seat inflating portion 11c. Further, the auxiliary inflating,chamber 11h communicates the lower end thereof with the lower end of the rear seat inflating portion 11d. In accordance with the embodiment mentioned above, as well as it is possible to quickly supply the gas from the gas supply port 11a of the air bag 11 to the front seat inflating portion 11c, it is possible to supply the gas to the lower end of the rear seat inflating portion 11d through the auxiliary inflating chamber 11h, whereby it is possible to further reduce the period of time until completing the deployment of the air bag 11. Here, in the case that the gas supply port 11a of the air bag 11 is provided so as to be displaced rearward in comparison with FIG. 39, it is desirable that the auxiliary inflating chamber 11h is provided close to the rear seat inflating portion 11d, and the lower end thereof is communicated with the lower end of the front seat inflating portion 11c.

Further, in the embodiment shown in FIG. 41, the gas supply port 11a of the air bag 11 is provided so as to be displaced forward in comparison with FIG. 39, and the auxiliary inflating chamber 11h is provided close to the front seat inflating portion 11c. Further, the auxiliary inflating chamber 11h communicates the lower end thereof with the respective lower ends of the front seat inflating portion 11c and the rear seat inflating portion 11d. In the embodiment mentioned above, as well as it is possible to quickly supply the gas from the gas supply port 11a of the air bag 11 to the front seat inflating portion 11c, it is also possible to supply the gas to the respective lower ends of the front seat inflating portion 11c and the rear seat inflating portion 11d through the auxiliary inflating chamber 11h, whereby it is possible to further reduce the period of time until completing the deployment of the air bag 11.

Further, in the embodiment shown in FIG. 39, 40 or 41, in the case of setting the opening area of the passage communicating the auxiliary inflating chamber 11h with the front seat inflating portion 11c (the opening area in the front portion of the upper gas passage 11b in the embodiment shown in FIGS. 39 and 40, and a sum of the opening area in the front portion of the upper gas passage 11b and the opening area of the lower gas passage 111 in the embodiment shown in FIG. 41), and the opening area of the passage communicating the auxiliary inflating chamber 11h with the rear seat inflating portion 11d (the opening area in the rear portion of the upper gas passage 11b in the embodiment shown in FIG. 39, and a sum of the opening area in the rear portion of the upper gas passage 11b and the opening area in the rear portion of the lower gas passage 111 in the embodiment shown in FIGS. 40 and 41) according to the capacities of the inflating chambers in the front seat inflating portion 11c and the rear seat inflating portion 11d, it is possible to substantially coincide the inflating and deploying timing of the front seat inflating portion 11c with that of the rear seat inflating portion 11d in the air bag 11 while reducing the period of time until completing the deployment of the air bag 11.

Figure 42:
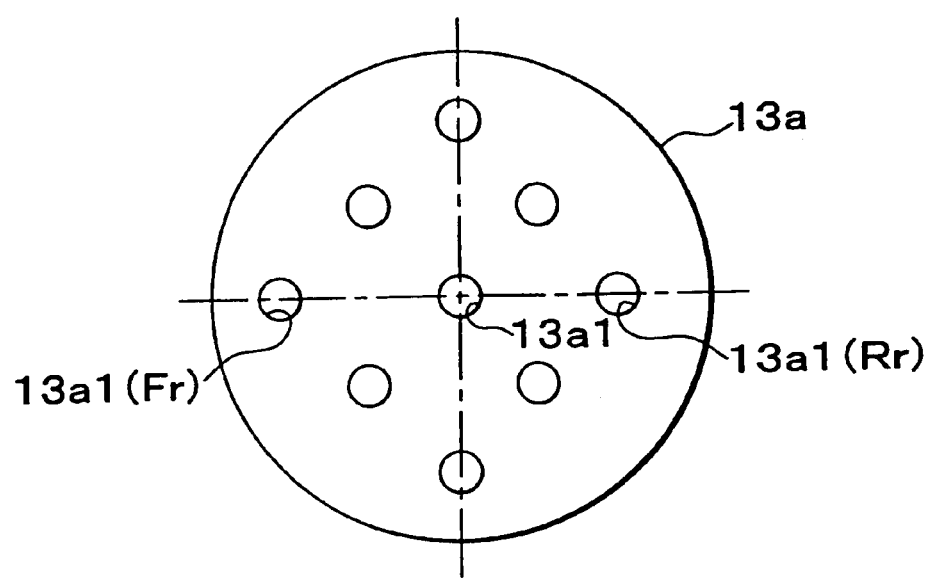
FIG. 42 is a bottom elevational view of an embodiment in which a distribution in the longitudinal direction with respect to the center of the front end of the shower head is different between the front seat injection holes and the rear seat injection holes provided in the shower head.

Further, at a time of realizing the present invention, as shown in FIG. 42, it is possible to differentiate the distribution in the longitudinal direction of the front seat injection holes 13a1(Fr) and the rear seat injection holes 13a1(Rr) provided in the shower head 13a with respect to the center of the front end (in which the injection hole 13a1 is provided) in the shower head. In the embodiment mentioned above, it is possible to adjust the injection pressures of the gas passing through the front seat injection holes 13a1(Fr) and the rear seat injection holes 13a1(Rr) (in FIG. 42, it is possible to strengthen the forward gas injection pressure), and it is possible to adjust the inflating and deploying timing of the front seat inflating portion 11c and the rear seat inflating portion 11d in the air bag 11. In this case, the hole diameters of the respective injection holes 13a1, 13a1(Fr) and 13a1(Rr) are the same.

Figure 43:
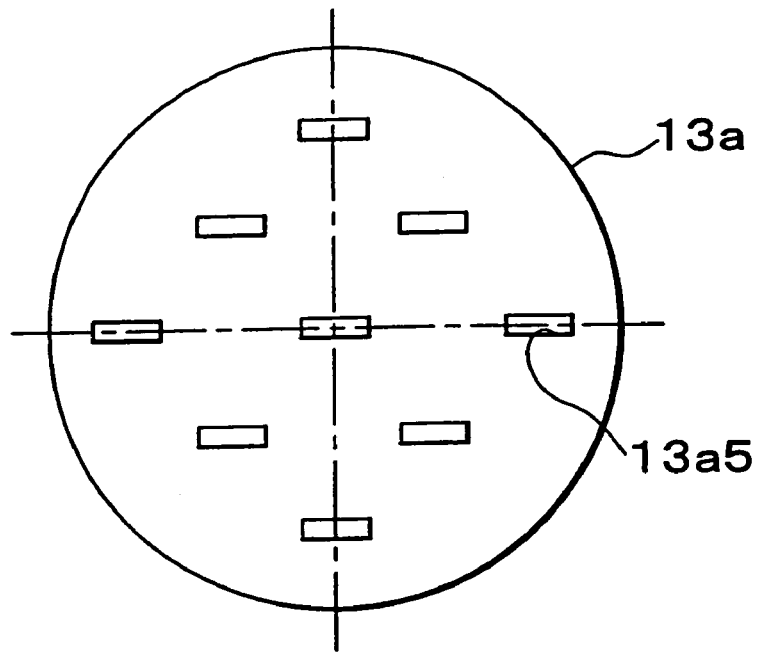
FIG. 43 is a bottom elevational view of an embodiment in which the injection hole provided in the shower head is constituted by a long hole longer in the longitudinal direction.
Figure 44:
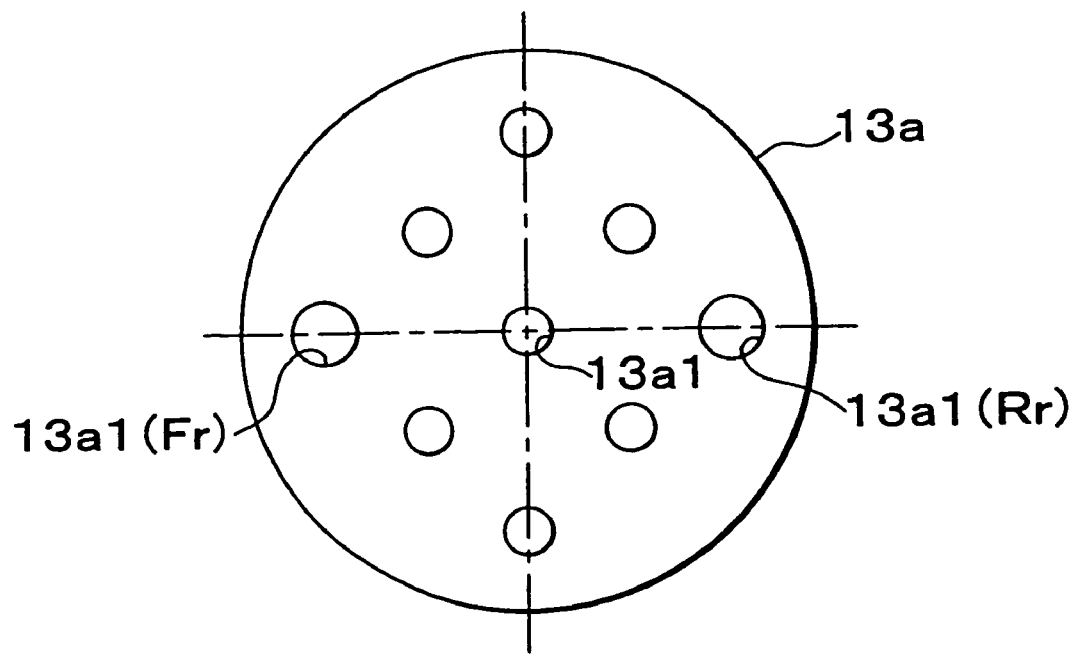
FIG. 44 is a bottom elevational view of an embodiment in which an opening area of the injection hole most apart in the longitudinal direction from the center of the front end in the shower head is made larger than that of the other injection holes among the injection holes provided in the shower head.

Further, as shown in FIG. 43, it is possible to form the rectangular injection hole 13a5 provided in the shower head 13a in a long hole being long in the longitudinal direction, or as shown in FIG. 44, it is possible to make the opening area (the hole diameter) of the injection holes 13a1(Fr) and 13a1(Rr) (the injection holes in the right and left ends in FIG. 44) most apart in the longitudinal direction from the center of the front end of the shower head among the injection holes 13a1 provided in the shower head 13a larger than the opening area (the hole diameter) of the other injection holes. In accordance with the embodiments, it is possible to strengthen the gas flow in the longitudinal direction, it is possible to positively inflate and deploy the air bag 11 on the basis of the same gas flow, and it is possible to inflate and deploy the air bag 11 with applying the directivity in the longitudinal direction.

Figure 45:
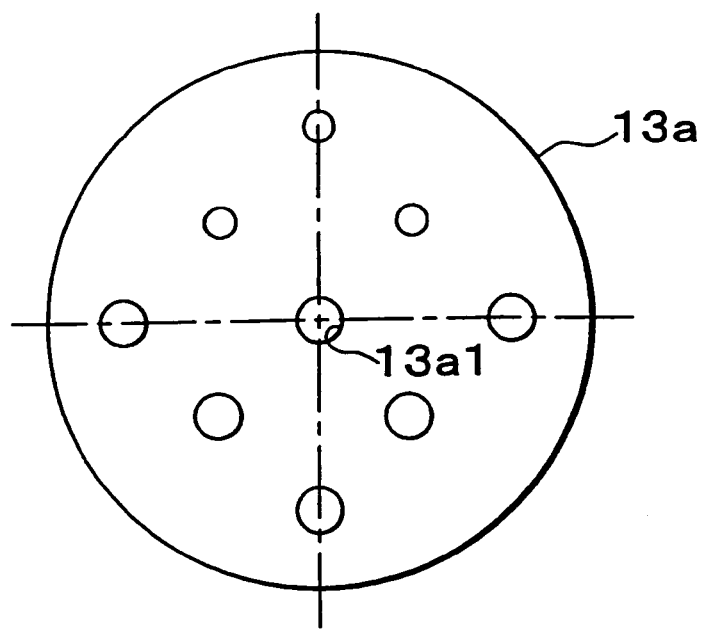
FIG. 45 is a bottom elevational view of an embodiment in which opening areas of the injection hole provided in the shower head are made different between the inner portion and the outer portion in the vehicle width direction.
Figure 46:
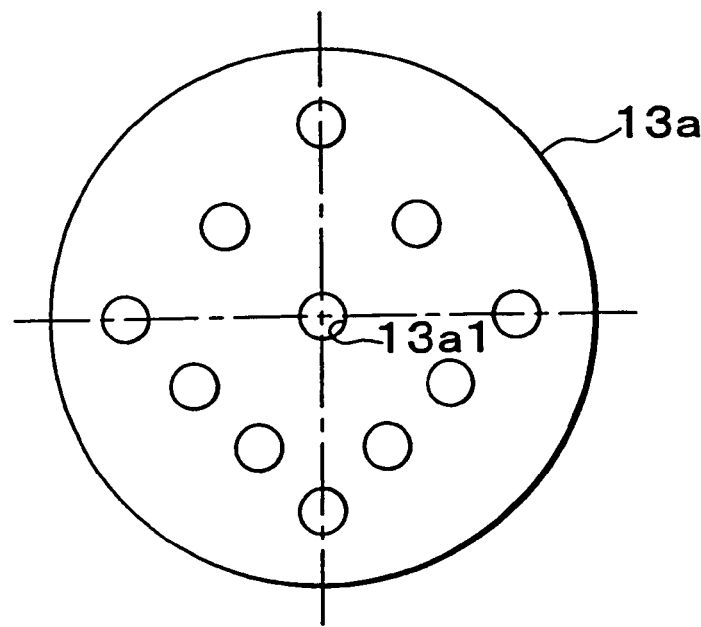
FIG. 46 is a bottom elevational view of an embodiment in which the numbers of the injection holes provided in the shower head are made different between the inner portion and the outer portion in the vehicle width direction.

Further, as shown in FIG. 45, it is possible to differentiate the opening area (the hole diameter) of the injection holes 13a1 provided in the shower head 13a between the inner side and the outer side in the vehicle width direction (in FIG. 45, the opening area in the inner side in the vehicle width direction is made larger), or as shown in FIG. 46, it is possible to differentiate the number of the injection holes 13a1 having the same diameter provided in the shower head 13a between the inner side and the outer side in the vehicle width direction (in FIG. 46, the number in the inner side in the vehicle width direction is made larger).

In the embodiments mentioned above, it is possible to inflate and deploy the air bag 11 in the portion in which the shower head 13a is arranged toward the inner side or the outer side in the vehicle width direction. Accordingly, for example, in the case of setting so as to inflate and deploy the air bag toward the inner side in the vehicle width direction, it is possible to prevent the air bag 11 in the middle of inflation and deployment from being caught on the upper end portion of the B pillar garnish 33 or the like, and further, in the case of setting so as to inflate and deploy the air bag 11 toward the outer side in the vehicle width direction, it is possible to inflate and deploy the air bag 11 along the door glass (the side glass) surface 41.

Figure 47:
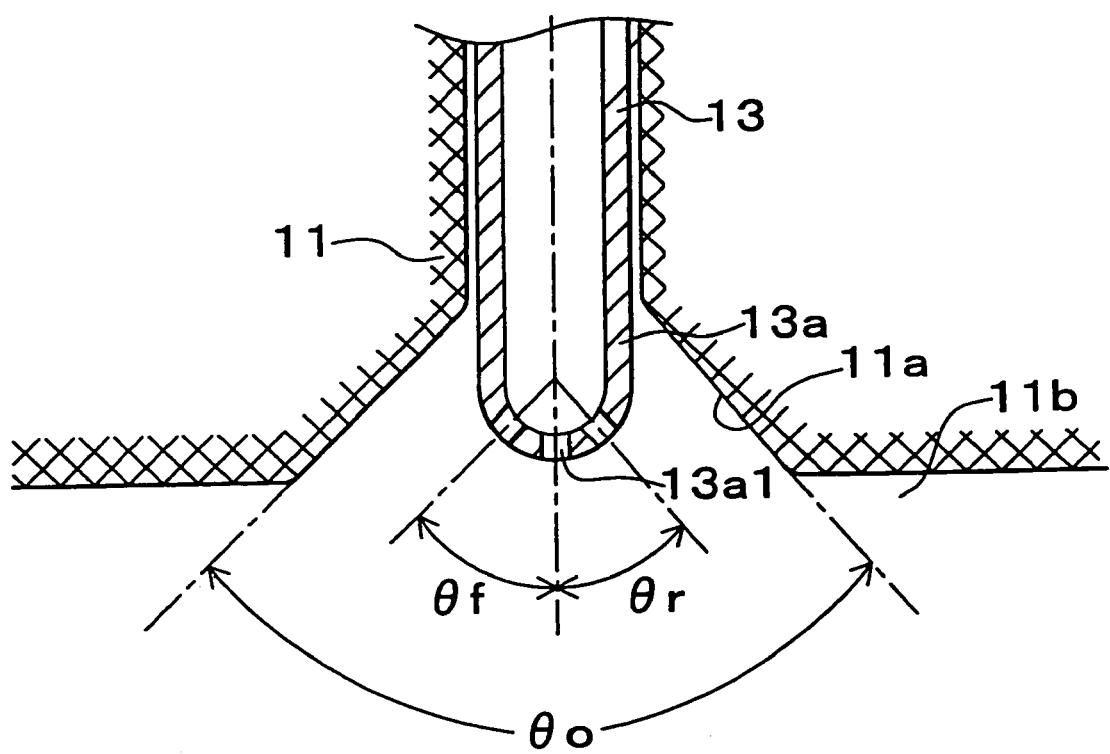
FIG. 47 is a side elevational view of an embodiment in which the gas supply port of the air bag to which the shower head is inserted is formed in a shape expanding at a predetermined angle toward the gas passage, and an angle of diffusion of the gas supplied from the shower head is made equal to or less than a predetermined angle.

Further, as shown in FIG. 47, it is possible to form the gas supply port 11a of the air bag 11 to which the shower head 13a is inserted in a shape expanding at a predetermined angle θo toward the gas passage 11b, and it is possible to make an angle of diffusion (θf+θr) in the longitudinal direction of the gas supplied from the shower head 13a equal to or less than the predetermined angle θo. In accordance with the embodiment mentioned above, even when the shower head 13a is arranged at any position of the gas supply port 11a in the air bag 11, the gas injected from the shower head 13a is not directly brought into contact with the gas supply port forming portion in the air bag 11, whereby it is possible to both reduce the damage on the gas supply port 11a forming portion in the air bag 11 and improve a diffusing property.

Figure 48:
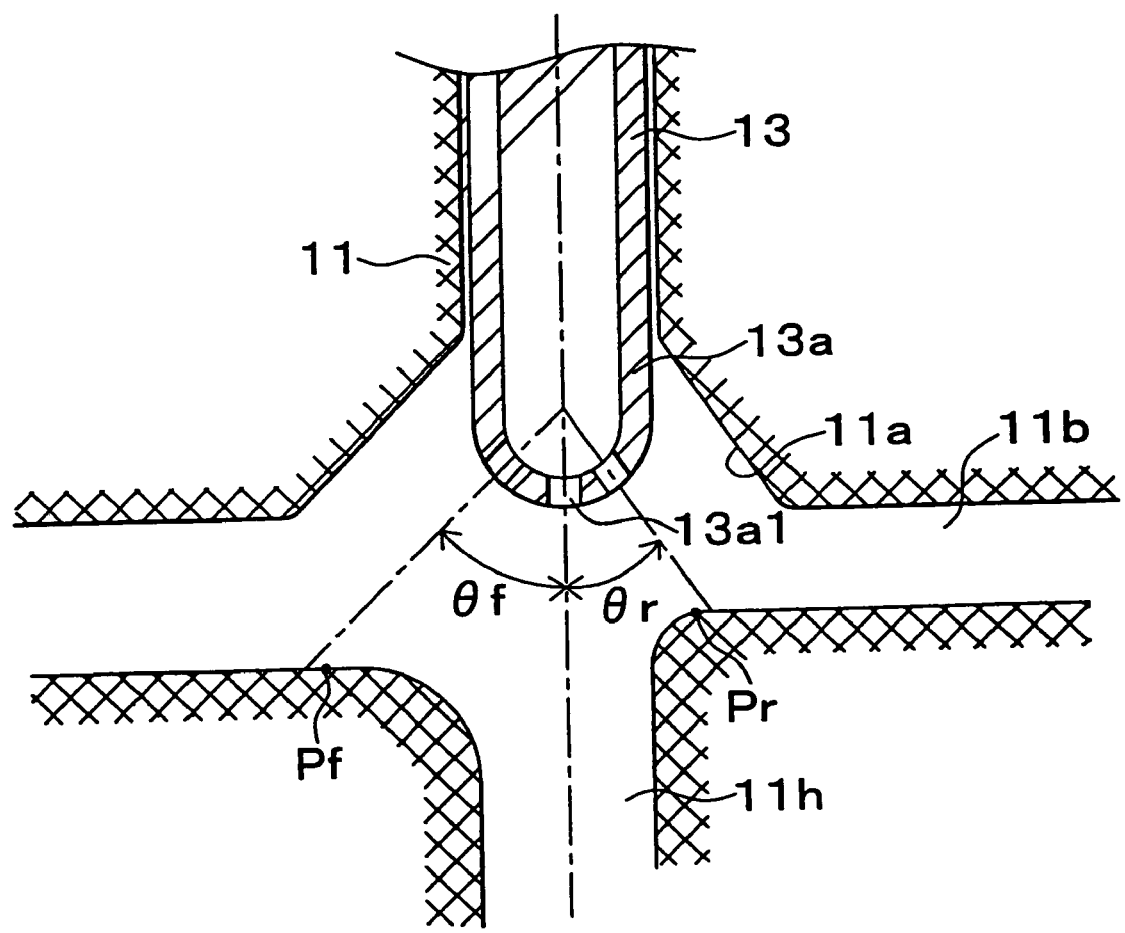
FIG. 48 is a side elevational view of an embodiment in which an auxiliary inflating chamber is provided in the air bag, an angle of diffusion in the longitudinal direction of the gas supplied from the shower head is made equal to or greater than a predetermined value, and the gas is injected to a forward portion rather than an R end point disposed in a forward portion of an upper end in the auxiliary inflating chamber and to a rearward portion rather than an R end point disposed in a rearward portion of the upper end.

Further, as shown in FIG. 48, in addition that the auxiliary inflating chamber 11h communicated with the gas passage 11b at the upper end below the front end of the shower head 13a and extending in the vertical direction is provided in the air bag, it is possible to set the angle of diffusion (θf+θr) in the longitudinal direction of the gas supplied from the shower head 13a to be equal to or greater than the predetermined value, so that the gas is injected to the forward portion rather than the R end point Pf in front of the upper end of the auxiliary inflating chamber 11h and to the rearward portion rather than the R end point Pr at the back of the upper end. In accordance with the embodiment mentioned above, in addition to securing the inflow of the gas to the auxiliary inflating chamber 11h, it is possible to distribute the gas well to the forward portion and the rearward portion of the gas passage 11b, and it is possible to improve the gas distributing property to the forward portion, the rearward portion and the lower portion from the shower head 13a.

Further, as shown in FIG. 48, in the case that the angle of diffusion θf of the gas diffusing from the shower head 13a to the forward portion is made different from the angle of diffusion θr to the rearward portion (in FIG. 48, θf>θr is set according to a ratio of capacity of the inflating chamber between the front seat inflating portion 11c and the rear seat inflating portion 11d), it is possible to change the gas distribution to the forward portion and the rearward portion in the gas passage 11b according to the shape of the air bag 11 (for example, a ratio of capacity of the inflating chamber or a shape of the inflating chamber between the front seat inflating portion 11c and the rear seat inflating portion 11d), and it is possible to inflate and deploy the air bag 11 in an optimum state.

Figure 49:
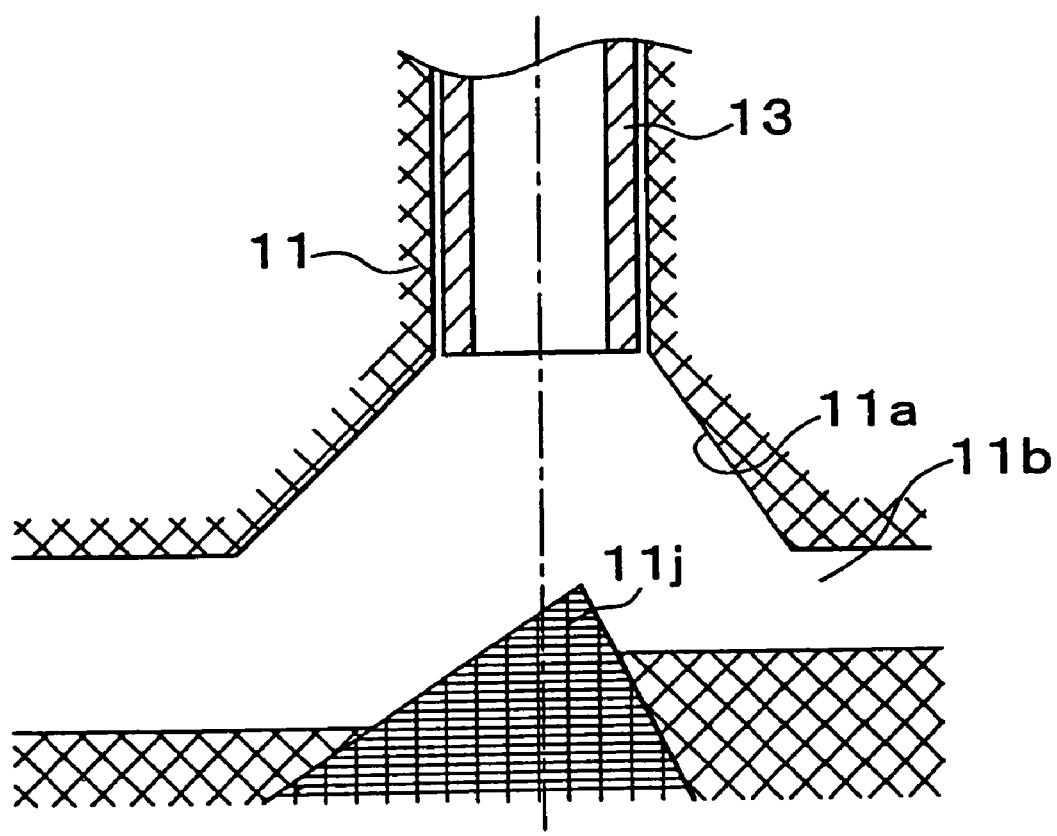
FIG. 49 is a side elevational view of an embodiment in which gas dispersing means is provided in a side of the air bag.

Further, in the embodiment mentioned above, in order to disperse the gas supplied from the inflator 14 in the three-dimensional direction so as to supply to the gas passage 11b in the air bag 11, the structure is realized by providing with the dispersing means (the shower head 13a) in the gas supply side, however, as shown in FIG. 49, the structure can be realized by providing with a dispersing means (a triangular bag base fabric 11j) in the air bag side. The triangular bag base fabric 11j (in which a seal agent is previously applied onto both front and back surfaces) is formed by being gripped between two base fabrics and being sewed along a triangular peripheral edge at a time when the sewn air bag 11 is produced by two base fabrics (in which a seal agent is previously applied to a mating face), in which a top portion exists immediately below the opening of the diffuser pipe 13 so as to disperse the gas supplied from the inflator through the diffuser pipe 13 in the three-dimensional direction and supply to the gas passage 11b in the air bag 11.

Further, in accordance with the embodiment mentioned above, the present invention is applied to the head portion protecting air bag apparatus for the passenger car vehicle. However, it is a matter of course that the present invention can be applied to a head portion protecting air bag apparatus for vehicles other than the passenger car, and the present invention can be applied to the other various air bag apparatuses structured such that the air bag housed in a part of the vehicle in a fold-up manner inflates and deploys due to the gas supplied from the inflator so as to protect the occupant, for example, an air bag apparatus for an assistant driver's seat which is assembled in an instrument panel, air bag apparatuses which are assembled in respective portion of the seats, and the like, on the basis of a suitable modification.

The invention claimed is:

1. An air bag apparatus wherein an air bag is housed along a roof side rail and is inflated and deployed in a curtain-like shape along a vehicle compartment side wall due to gas supplied from an inflator that is disposed outside the air bag and is arranged in a center portion along a longitudinal direction of a vehicle so as to protect a head portion of an occupant, the air bag is provided with an inflating portion for a front seat and an inflating portion for a rear seat, a gas passage for communicating upper portions of both of these inflating portions and a single gas supply port that opens into the gas passage from upward, and wherein a shower head for dispersing the gas supplied from the inflator in a three-dimensional direction is disposed so as to face the gas supply port of the air bag and the shower head has a plurality of injection holes which are directed to the three-dimensional direction.

2. An air bag apparatus according to claim 1, wherein the shower head is formed in a semispherical shape and has the plurality of injection holes on a spherical surface thereof.

3. An air bag apparatus according to claim 1, wherein the injection holes of the shower head are provided symmetrically with respect to a point of a center of the shower head.

4. An air bag apparatus according to claim 1, wherein the shower head is formed by a mesh.

5. An air bag apparatus according to claim 4, wherein the shower head is formed in a semispherical shape.

6. An air bag apparatus according to claim 1, wherein the shower head is formed by a porous body.

7. An air bag apparatus according to claim 6, wherein the shower head is formed in a semispherical shape.

8. An air bag apparatus according to claim 1, wherein the shower head is provided in a front end of a diffuser pipe assembled in the inflator.

9. An air bag apparatus according to claim 8, wherein the front end portion of the diffuser pipe is formed so as to have a small diameter and the shower head is fitted and fixed to an outer periphery of the front end portion of the diffuser pipe.

10. An air bag apparatus according to claim 9, wherein a gas supply port forming portion of the air bag is fixed to the step portion formed by the front end portion of the diffuser pipe and the shower head.

11. An air bag apparatus according to claim 1, wherein the shower head is integrally provided in the inflator.

12. An air bag apparatus according to claim 1, wherein the shower head does not protrude within the gas passage of the air bag.

13. An air bag apparatus according to claim 12, wherein the inflator is arranged in a center portion in a longitudinal direction of a vehicle.

14. An air bag apparatus according to claim 13, wherein the inflator is arranged in a longitudinal direction along the roof side rail above the air bag.

15. An air bag apparatus according to claim 14, wherein the inflator is arranged in a vehicle width direction along a roof panel above the air bag.

16. An air bag apparatus according to claim 8, wherein the diffuser pipe is formed in a substantially J shape.

17. An air bag apparatus according to claim 1, wherein the shower head is coaxially arranged with respect to the longitudinal direction of the gas passage communicating with the inflating chamber of the air bag.

18. An air bag apparatus according to claim 17, wherein the inflator is arranged in front of or at the rear of the vehicle of the air bag.

19. An air bag apparatus according to claim 18, wherein the shower head is arranged in the gas passage at a portion of the air bag communicating with the inflating chamber.

20. An air bag apparatus according to claim 1, wherein the plurality of injection holes provided in the shower head are concentrically arranged with a center of the front end of the shower head so as to form a plurality of lines.

21. An air bag apparatus according to claim 20, wherein a plurality of inner and outer injection holes concentrically arranged and being adjacent to each other in a radial direction are arranged in a circumferential direction so as to form a zigzag form.

22. An air bag apparatus according to claim 20, wherein the shower head is formed in a stepped shape having multiple steps which become smaller toward the front end, and the plurality of injection holes is formed in the respective step portions in an inclined manner.

23. An air bag apparatus according to claim 20, wherein the injection holes are formed in a fan shape expanding toward the front end.

24. An air bag apparatus according to claim 1, wherein the front end of the shower head is formed in an asymmetrical shape with respect to a center axis thereof and the injection holes are formed in the asymmetrical surface.

25. An air bag apparatus according to claim 1, wherein the injection holes are formed in a stepped shape and a thickness of a minimum hole portion is made small.

26. An air bag apparatus according to claim 1, wherein the injection holes formed in the front end wall of the shower head are inclined with respect to the wall surface of the front end wall.

27. An air bag apparatus according to claim 1, wherein the shower head is formed in a closed-end cylindrical shape or a closed-end polygonal tubular shape, the injection holes are formed in the front end wall of the shower head, and the injection holes are formed so as to ride over the front wall of the shower head and a peripheral wall.

28. An air bag apparatus according to claim 1, wherein distribution in a longitudinal direction with respect to the center of the front end in the shower head is made different between the front seat injection hole and the rear seat injection hole which are provided in the shower head.

29. An air bag apparatus according to claim 1, wherein the injection holes provided in the shower head are formed in a long hole longer in the longitudinal direction.

30. An air bag apparatus according to claim 1, wherein an opening area of the injection hole being most apart in the longitudinal direction from the center of the front end of the shower head among the plurality of injection holes provided in the shower head is made larger than an opening area of the other injection holes.

31. An air bag apparatus according to claim 1, wherein opening areas of the injection holes provided in the shower head are made different between an inner portion and an outer portion in the vehicle width direction.

32. An air bag apparatus according to claim 1, wherein numbers of the injection holes provided in the shower head are made different between an inner portion and an outer portion in the vehicle width direction.

33. An air bag apparatus according to claim 1, wherein the gas supply port of the air bag to which the shower head is inserted is formed in a shape expanding at a predetermined angle toward the gas passage, and an angle of diffusion of the gas supplied from the shower head is made equal to or less than the predetermined angle.

34. An air bag apparatus according to claim 1, wherein an auxiliary inflating chamber communicating with the gas passage at an upper end below the front end of the shower head and extending in a vertical direction is provided in the air bag, and an angle of diffusion in the longitudinal direction of the gas supplied from the shower head is set to be equal to or greater than a predetermined value so that the gas is injected farther forward than an end point disposed in a forward portion of the upper end of the auxiliary inflating chamber and farther rearward than an end point disposed in a rearward portion of the upper end.

35. An air bag apparatus according to claim 34, wherein the angle of forward diffusion of the gas from the shower head is made different from the angle of rearward diffusion.

36. An air bag apparatus wherein an air bag is housed along a roof side rail and is inflated and deployed in a curtain-like shape along a vehicle compartment side wall due to gas supplied from an inflator so as to protect a head portion of an occupant, the air bag is provided with an inflating portion for a front seat and an inflating portion for a rear seat and a gas passage for communicating upper portions of both of these inflating portions, and wherein a shower head for dispersing the gas supplied from the inflator in a three-dimensional direction is disposed so as to face the gas passage of the air bag and the shower head has a plurality of injection holes which are directed to the three-dimensional direction, wherein
opening areas of an injection hole for the front seat and an injection hole for the rear seat provided in the shower head are set according to capacities of expansion chambers in the front seat inflating portion and the rear seat inflating portion.

37. An air bag apparatus according to claim 36, wherein hole diameters are made different between the front seat injection hole and the rear seat injection hole which are provided in the shower head, whereby it is possible to set the opening areas of the front seat injection hole and the rear seat injection hole according to the capacities of the inflating chambers in the front seat inflating portion and the rear seat inflating portion.

38. An air bag apparatus according to claim 37, wherein the front seat injection holes and the rear seat injection holes are respectively constituted by the plurality of injection holes, and a hole diameter of any one thereof is gradually reduced toward the center of the front end in the shower head.

39. An air bag apparatus according to claim 36, wherein numbers of holes are made different between the front seat injection hole and the rear seat injection hole which are provided in the shower head, whereby it is possible to set the opening areas of the front seat injection hole and the rear seat injection hole according to the capacities of the inflating chambers in the front seat inflating portion and the rear seat inflating portion.

40. An air bag apparatus according to claim 36, wherein an auxiliary inflating chamber communicating with the gas passage at an upper end below the front end of the shower head so as to extend in a vertical direction is provided in the air bag.

41. An air bag apparatus according to claim 40, wherein a lower end of the auxiliary inflating chamber is communicated with at least one of the front seat inflating portion and the rear seat inflating portion.

42. An air bag apparatus according to claim 40, wherein an opening area of a passage for communicating the auxiliary inflating chamber with the front seat inflating portion and an opening area of a passage for communicating the auxiliary inflating chamber with the rear seat inflating portion are set according to the capacities of the inflating chambers in the front seat inflating portion and the rear seat inflating portion.

* * * * *